(12) United States Patent
Kikuchi

(10) Patent No.: US 12,394,088 B2
(45) Date of Patent: Aug. 19, 2025

(54) ESTIMATION APPARATUS, IMAGING APPARATUS, MOVING OBJECT, ESTIMATION SYSTEM, ESTIMATION METHOD, AND PROGRAM

(71) Applicant: FUJIFILM CORPORATION, Tokyo (JP)

(72) Inventor: Hiroaki Kikuchi, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 12 days.

(21) Appl. No.: 18/599,208

(22) Filed: Mar. 8, 2024

(65) Prior Publication Data

US 2024/0212208 A1    Jun. 27, 2024

Related U.S. Application Data

(63) Continuation of application No. PCT/JP2022/020259, filed on May 13, 2022.

(30) Foreign Application Priority Data

Sep. 30, 2021   (JP) .................................. 2021-161787

(51) Int. Cl.
   *G06T 7/73*         (2017.01)
(52) U.S. Cl.
   CPC ...... *G06T 7/74* (2017.01); *G06T 2207/10032* (2013.01); *G06T 2207/20224* (2013.01)
(58) Field of Classification Search
   CPC ... G06T 7/73; G06T 7/74; G06T 2207/10032; G06T 2207/20224; G01B 11/00; G01S 5/16; G05D 1/00
   (Continued)

(56) References Cited

U.S. PATENT DOCUMENTS 12,105,200 B2 * 10/2024 Onal .................... G01N 21/359
2017/0031369 A1    2/2017 Liu et al.
(Continued)

FOREIGN PATENT DOCUMENTS

DE    102018100417 B4 * 12/2022 ............. F41G 3/145
JP    2000-055657 A     2/2000
(Continued)

OTHER PUBLICATIONS

International Search Report issued in International Application No. PCT/JP2022/020259 on Jul. 5, 2022.
(Continued)

*Primary Examiner* — Peet Dhillon
(74) *Attorney, Agent, or Firm* — SOLARIS Intellectual Property Group, PLLC

(57) ABSTRACT

An estimation apparatus includes a processor, in which the processor is configured to acquire positional information of a plurality of reference stations each having a light emitter that emits light in wavelength bands different from each other, acquire image data obtained by imaging an imaging scene including the light emitter via an imaging apparatus mounted on a moving object, and estimate at least one of a position of the moving object or a posture of the moving object based on an in-image position, which is a position of the light emitter in an image indicated by the image data, and the positional information of the plurality of reference stations.

14 Claims, 13 Drawing Sheets

(58) Field of Classification Search
USPC ............................................... 348/144
See application file for complete search history.

(56) References Cited

U.S. PATENT DOCUMENTS

| | | | |
|---|---|---|---|
| 2020/0288072 A1* | 9/2020 | Seok | ...................... H04N 23/88 |
| 2020/0342622 A1* | 10/2020 | Takeuchi | .................. G06T 7/73 |
| 2022/0067942 A1 | 3/2022 | Ono | |

FOREIGN PATENT DOCUMENTS

| | | | |
|---|---|---|---|
| JP | 2002-213920 A | 7/2002 |
| JP | 2008-145386 A | 6/2008 |
| JP | 2015-190931 A | 11/2015 |
| JP | 2019-095963 A | 6/2019 |
| JP | 2019-144183 A | 8/2019 |
| JP | 2020-180842 A | 11/2020 |
| JP | 2022-039246 A | 3/2022 |

OTHER PUBLICATIONS

Written Opinion of the ISA issued in International Application No. PCT/JP2022/020259 on Jul. 5, 2022.
International Preliminary Report on Patentability issued in International Application No. PCT/JP2022/020259 on Nov. 4, 2022.

* cited by examiner

ESTIMATION APPARATUS, IMAGING APPARATUS, MOVING OBJECT, ESTIMATION SYSTEM, ESTIMATION METHOD, AND PROGRAM

CROSS-REFERENCE TO RELATED APPLICATIONS

This application is a continuation application of International Application No. PCT/JP2022/020259, filed May 13, 2022, the disclosure of which is incorporated herein by reference in its entirety. Further, this application claims priority from Japanese Patent Application No. 2021-161787, filed Sep. 30, 2021, the disclosure of which is incorporated herein by reference in its entirety.

BACKGROUND

Technical Field

The technology of the present disclosure relates to an estimation apparatus, an imaging apparatus, a moving object, an estimation system, an estimation method, and a non-transitory storage medium storing a program.

Related Art

JP2019-095963A discloses a position control system of a moving object, the position control system comprising a moving object that is remotely controllable or automatically controllable and that includes a plurality of light emitters that emit light having different wavelengths, and a ground object that is installed on a ground, in which the ground object includes a light receiving section that images the plurality of light emitters, a processing section that obtains two-dimensional coordinates of the plurality of light emitters on a two-dimensional captured image captured by the light receiving section and that obtains three-dimensional coordinates of the moving object based on the obtained two-dimensional coordinates of the plurality of light emitters, and a control unit that controls the moving object to move such that the three-dimensional coordinates obtained by the processing section match three-dimensional coordinates of a target set in advance.

JP2000-055657A discloses a positioning device that identifies a plurality of moving objects moving on a floor in a room and that measures two-dimensional positions of the respective moving objects, the positioning device comprising a base station, a transmission means, and an imaging camera, the base station transmitting an identification signal corresponding to a specific moving object to all the moving objects via the transmission means, the transmission means being provided together with a light source in each moving object and receiving the identification signal to determine whether or not the identification signal corresponds to an identification signal thereof and causing the light source to emit light in a case where the identification signal corresponds to the identification signal of the reception means, the imaging camera imaging the light source of the moving object that emits light to transmit the image to the base station, in which the base station matches a position of the image to a two-dimensional position of the floor to measure a position of the moving object.

JP2019-144183A discloses a three-dimensional coordinate measuring device comprising six or more reflection markers that are arranged on a surface of an object placed in an environment of natural light and that reflect one monochromatic light included in the natural light, a light source that irradiates the object with the monochromatic light, a filter of which a transmittance of a wavelength of the monochromatic light is lower than a transmittance of the other monochromatic light included in the natural light, a camera that captures three or more images of the object from different positions through the filter, and a three-dimensional coordinate extraction unit that executes photogrammetry on positions of the reflection markers in the three or more images, executes SfM using a result of the photogrammetry and feature points in the images excluding the reflection markers, and extracts three-dimensional coordinates of the object.

SUMMARY

One embodiment according to the technology of the present disclosure provides an estimation apparatus, an imaging apparatus, a moving object, an estimation system, an estimation method, and a non-transitory storage medium storing a program capable of estimating at least one of a position or a posture of the moving object even in an environment where it is difficult to use a GNSS.

A first aspect according to the technology of the present disclosure is an estimation apparatus comprising a processor, in which the processor is configured to acquire positional information of a plurality of reference stations each having a light emitter that emits light in wavelength bands different from each other, acquire image data obtained by imaging an imaging scene including the light emitter via an imaging apparatus mounted on a moving object, and estimate at least one of a position of the moving object or a posture of the moving object based on an in-image position, which is a position of the light emitter in an image indicated by the image data, and the positional information of the plurality of reference stations.

A second aspect according to the technology of the present disclosure is the estimation apparatus according to the first aspect, in which the image data includes a plurality of image data groups obtained by imaging the imaging scene via the imaging apparatus in a plurality of the wavelength bands, and the processor is configured to specify the in-image position of a light emitter of one reference station among the plurality of reference stations, based on a result of subtraction processing of first image data obtained by imaging the imaging scene in a light emitter wavelength band, which is a wavelength band in which the light emitter of the one reference station emits light, and second image data obtained by imaging in a first adjacent wavelength band, which has a central wavelength on one of a long wavelength side or a short wavelength side by a designated wavelength from a central wavelength of the light emitter wavelength band.

A third aspect according to the technology of the present disclosure is the estimation apparatus according to the second aspect, in which the processor is configured to specify the in-image position of the light emitter of the one reference station, based on a result of subtraction processing of the first image data and third image data obtained by imaging in a second adjacent wavelength band, which has a central wavelength on another side with respect to the first adjacent wavelength band by a designated wavelength from the central wavelength of the light emitter wavelength band.

A fourth aspect according to the technology of the present disclosure is the estimation apparatus according to the first aspect, in which the image data includes a plurality of image data groups obtained by imaging the imaging scene via the imaging apparatus in a plurality of the wavelength bands, and the processor is configured to specify the in-image position of a light emitter of one reference station among the plurality of reference stations, based on a result of subtraction processing of first image data obtained by imaging in a light emitter wavelength band, which is a wavelength band in which the light emitter of the one reference station emits light, and fourth image data obtained by imaging in a third adjacent wavelength band, which has a wavelength having the highest intensity on one of a long wavelength side or a short wavelength side by a designated wavelength from a wavelength having the highest intensity in the light emitter wavelength band.

A fifth aspect according to the technology of the present disclosure is the estimation apparatus according to the fourth aspect, in which the processor is configured to specify the in-image position of the light emitter of the one reference station, based on a result of subtraction processing of the first image data and fifth image data obtained by imaging in a fourth adjacent wavelength band, which has a wavelength having the highest intensity on another side with respect to the third adjacent wavelength band by a designated wavelength from the wavelength having the highest intensity in the light emitter wavelength band.

A sixth aspect according to the technology of the present disclosure is the estimation apparatus according to any one of the first to fifth aspects, in which the image data includes a plurality of image data groups obtained by imaging the imaging scene via the imaging apparatus in a plurality of the wavelength bands, and the processor is configured to specify the in-image position of a light emitter of one reference station among the plurality of reference stations, based on sixth image data obtained by imaging in a wavelength band different from a light emitter wavelength band in which the light emitter of the one reference station emits light.

A seventh aspect according to the technology of the present disclosure is the estimation apparatus according to any one of the first to sixth aspects, in which the positional information is obtained by converting a latitude and a longitude of each of the plurality of reference stations into coordinates in a two-dimensional orthogonal coordinate system.

An eighth aspect according to the technology of the present disclosure is the estimation apparatus according to any one of the first to sixth aspects, in which the positional information is obtained by converting a latitude, a longitude, and an altitude of each of the plurality of reference stations into coordinates in a three-dimensional orthogonal coordinate system.

A ninth aspect according to the technology of the present disclosure is the estimation apparatus according to any one of the first to eighth aspects, in which the plurality of reference stations are three or more.

A tenth aspect according to the technology of the present disclosure is an imaging apparatus comprising an image sensor, and the estimation apparatus according to any one of the first to ninth aspects, in which the estimation apparatus is configured to estimate at least one of the position of the moving object or the posture of the moving object using an image obtained by imaging the imaging scene via the image sensor.

An eleventh aspect according to the technology of the present disclosure is the imaging apparatus according to the tenth aspect, in which the image sensor is an image sensor capable of imaging in a multispectral method.

A twelfth aspect according to the technology of the present disclosure is a moving object comprising an imaging apparatus, and an estimation apparatus, in which the estimation apparatus is configured to acquire positional information of a plurality of reference stations each having a light emitter that emits light in wavelength bands different from each other, acquire image data obtained by imaging an imaging scene including the light emitter via the imaging apparatus, and estimate at least one of a position of the moving object or a posture of the moving object based on an in-image position, which is a position of the light emitter in an image indicated by the image data, and the positional information of the plurality of reference stations.

A thirteenth aspect according to the technology of the present disclosure is an estimation system comprising a moving object on which an imaging apparatus is mounted, an estimation apparatus, and a plurality of reference stations each having a light emitter that emits light in wavelength bands different from each other, in which the estimation apparatus is configured to acquire positional information of the plurality of reference stations, acquire image data obtained by imaging an imaging scene including the light emitter via the imaging apparatus, and estimate at least one of a position of the moving object or a posture of the moving object based on an in-image position, which is a position of the light emitter in an image indicated by the image data, and the positional information of the plurality of reference stations.

A fourteenth aspect according to the technology of the present disclosure is an estimation method comprising acquiring positional information of a plurality of reference stations each having a light emitter that emits light in wavelength bands different from each other, acquiring image data obtained by imaging an imaging scene including the light emitter via an imaging apparatus mounted on a moving object, and estimating at least one of a position of the moving object or a posture of the moving object based on an in-image position, which is a position of the light emitter in an image indicated by the image data, and the positional information of the plurality of reference stations.

A fifteenth aspect according to the technology of the present disclosure is a non-transitory storage medium storing a program causing a computer to execute a process comprising acquiring positional information of a plurality of reference stations each having a light emitter that emits light in wavelength bands different from each other, acquiring image data obtained by imaging an imaging scene including the light emitter via an imaging apparatus mounted on a moving object, and estimating at least one of a position of the moving object or a posture of the moving object based on an in-image position, which is a position of the light emitter in an image indicated by the image data, and the positional information of the plurality of reference stations.

DETAILED DESCRIPTION

Hereinafter, an example of an embodiment of an estimation apparatus, an imaging apparatus, a moving object, an estimation system, an estimation method, and a program according to the technology of the present disclosure will be described with reference to the accompanying drawings.

First, the wording used in the following description will be described.

CPU is an abbreviation for "central processing unit". GPU is an abbreviation for "graphics processing unit". RAM is an abbreviation for "random access memory". EEPROM is an abbreviation for "electrically erasable programmable read-only memory". IC is an abbreviation for "integrated circuit". ASIC is an abbreviation for "application specific integrated circuit". PLD is an abbreviation for "programmable logic device". FPGA is an abbreviation for "field-programmable gate array". SoC is an abbreviation for "system-on-a-chip". SSD is an abbreviation for "solid state drive". USB is an abbreviation for "universal serial bus". HDD is an abbreviation for "hard disk drive". EL is an abbreviation for "electro-luminescence". I/F is an abbreviation for "interface". UI is an abbreviation for "user interface". GUI is an abbreviation for "graphical user interface". CMOS is an abbreviation for "complementary metal oxide semiconductor". CCD is an abbreviation for "charge coupled device". GNSS is an abbreviation for "global navigation satellite system". LED is an abbreviation for "light emitting diode".

First Embodiment

Figure 1:
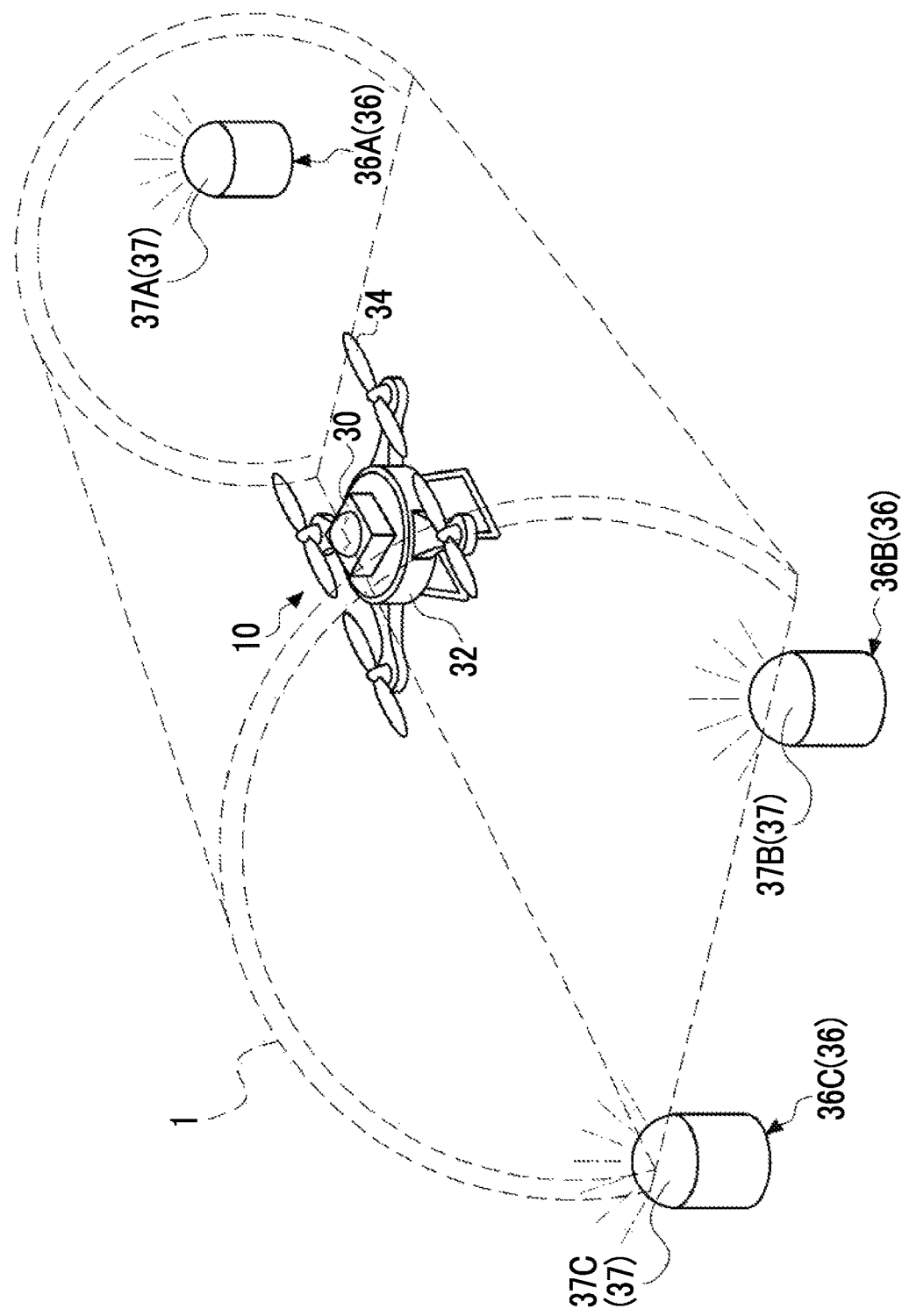
FIG. 1 is a conceptual diagram showing an example of a use state of a moving object.

A moving object 10 is used for surveying and/or inspecting land and/or infrastructure, or the like. Examples of the infrastructure include road facilities (for example, a bridge, a road surface, a tunnel, a guardrail, a traffic light, and/or a windbreak fence), waterway facilities, airport facilities, port facilities, water storage facilities, gas facilities, power supply facilities, medical facilities, and/or firefighting facilities. As shown in FIG. 1 as an example, the moving object 10 is an unmanned aerial vehicle (for example, a drone) that flies in a tunnel 1.

As shown in FIG. 1 as an example, the moving object 10 comprises a main body 32 and a plurality of propellers 34 (four propellers in the example shown in FIG. 1). The moving object 10 flies or hovers in a three-dimensional space by controlling a rotation of each of the plurality of propellers 34. Further, an imaging apparatus 30 is mounted on the moving object 10. The moving object 10 is an example of a "moving object" according to the technology of the present disclosure, and the imaging apparatus 30 is an example of an "imaging apparatus" according to the technology of the present disclosure.

Here, the unmanned aerial vehicle is described as an example of the moving object 10, but the technology of the present disclosure is not limited to this. For example, the moving object 10 may be a vehicle. Examples of the vehicle include a vehicle with a gondola, an aerial work vehicle, and a bridge inspection vehicle. In addition, the moving object 10 may be a slider, a carriage, or the like on which the imaging apparatus 30 can be mounted. In addition, the moving object 10 may be a person. Here, the person refers to, for example, a worker who performs survey and/or inspection for land and/or infrastructure, or the like. In a case where the moving object 10 is a person, the phrase "the imaging apparatus 30 is mounted" includes an aspect in which the imaging apparatus 30 is gripped by the person and/or the imaging apparatus 30 is attached to equipment (for example, a helmet, work clothes, or the like) worn by the person. In addition, the moving object 10 may be a ship or an underwater drone.

Meanwhile, in a case where inspection or the like is performed on infrastructure or the like using the moving object 10, it is required to grasp a position and a posture of the moving object 10 to control a movement of the moving object 10. It is known that GNSS is used to grasp the position and the posture of the moving object 10. However, as shown in FIG. 1 as an example, in a case in which the moving object 10 is placed in a shielded environment such as the inside of the tunnel 1, communication between a satellite used in the GNSS and the moving object 10 is interrupted, and thus it is difficult to estimate the position and the posture of the moving object 10.

Therefore, in the present embodiment, to realize estimation of the position and the posture of the moving object 10 even in an environment where communication with an outside (for example, a satellite) is difficult, as shown in FIG. 1 as an example, the position and the posture of the moving object 10 are estimated by imaging a light emitter 37 of a reference station 36 via the imaging apparatus 30.

The reference station 36 is used for estimating the position and the posture of the moving object 10. The reference station 36 is provided at a position where the light emitter 37 can be imaged by the imaging apparatus 30 of the moving object 10. In the example shown in FIG. 1, the reference station 36 is installed around an entrance and an exit of the tunnel 1. Three or more reference stations 36 are installed. In the example shown in FIG. 1, three reference stations 36 are installed. In the example shown in FIG. 1, the three reference stations 36 are a first reference station 36A, a second reference station 36B, and a third reference station 36C.

Here, although the three reference stations 36 are exemplified, this is merely an example, and four reference stations 36 may be installed around the moving object 10, and the technology of the present disclosure is established as long as three or more reference stations 36 are installed around the moving object 10.

The light emitter 37 is provided in the reference station 36. The light emitter 37 emits light in a predetermined wavelength band. The light emitter 37 is, for example, an LED light source. The light emitter 37 provided in each of the three reference stations 36 emits light in wavelength bands different from each other between the reference stations 36. For example, each of the three reference stations 36 includes a blue LED light source, a yellow LED light source, and a red LED light source as the light emitter 37.

Although an example in which the LED light source is used as the light emitter 37 has been described, this is merely an example. The light emitter 37 may be a light source that can emit light in a predetermined wavelength band, and for example, an electroluminescent light source or a fluorescent lamp may be used as the light emitter 37.

In the example shown in FIG. 1, the first reference station 36A is provided with a first light emitter 37A. In addition, the second reference station 36B is provided with a second light emitter 37B. Further, the third reference station 36C is provided with a third light emitter 37C. The first light emitter 37A is a blue LED light source, the second light emitter 37B is a yellow LED light source, and the third light emitter 37C is a red LED light source.

Figure 2:
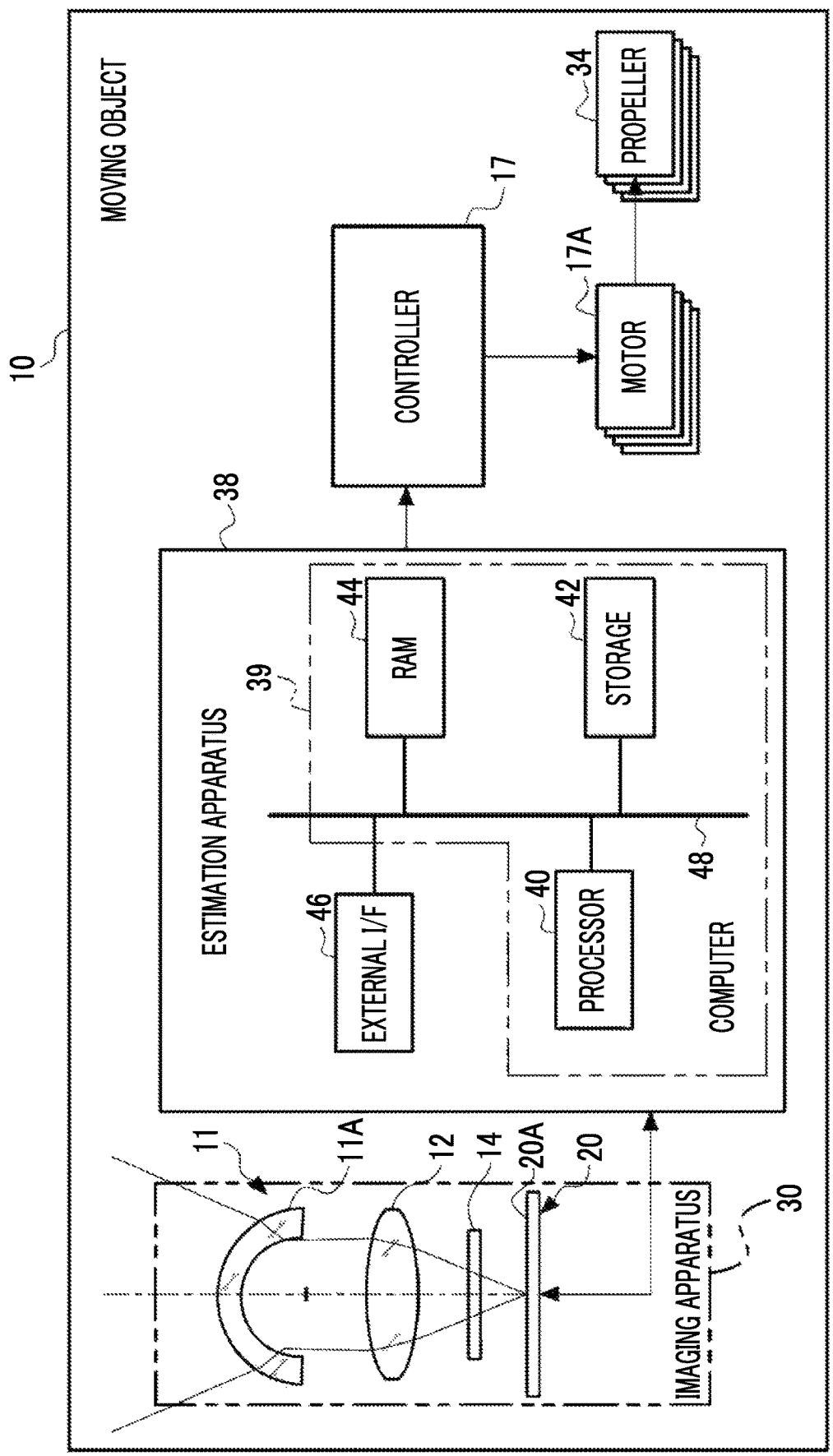
FIG. 2 is a block diagram showing an example of a hardware configuration of the moving object.

As shown in FIG. 2 as an example, the moving object 10 comprises the imaging apparatus 30, a controller 17, and an estimation apparatus 38. The controller 17 is realized by, for example, an IC chip. A plurality of motors 17A are provided in the main body 32. The plurality of motors 17A are connected to the plurality of propellers 34. The controller 17 controls the flight of the moving object 10 by controlling the plurality of motors 17A.

The estimation apparatus 38 comprises a computer 39 and an external I/F 46. The computer 39 comprises a processor 40, a storage 42, and a RAM 44. The processor 40, the storage 42, the RAM 44, and the external I/F 46 are connected to a bus 48. The estimation apparatus 38 is an example of an "estimation apparatus" according to the technology of the present disclosure. In addition, the computer 39 is an example of a "computer" according to the technology of the present disclosure. Moreover, the processor 40 is an example of a "processor" according to the technology of the present disclosure.

For example, the processor 40 has a CPU and a GPU and controls the entire estimation apparatus 38. The GPU operates under the control of the CPU, and is responsible for executing screen display and/or image processing. In addition, the processor 40 may be one or more CPUs with which the functions of the GPU have been integrated or may be one or more CPUs with which the functions of the GPU have not been integrated.

The storage 42 is a nonvolatile storage device that stores various programs, various parameters, and the like. An example of the storage 42 is a flash memory (for example, an EEPROM and/or an SSD) and/or an HDD. The flash memory and/or the HDD are merely examples, and a nonvolatile storage device such as a magnetic resistance memory, and/or a ferroelectric memory may be used instead of the HDD and/or the flash memory or together with the HDD and/or the flash memory. The RAM 44 is a memory in which information is temporarily stored and is used as a work memory by the processor 40.

The imaging apparatus 30 images an imaging scene around the moving object 10. The imaging scene includes the light emitters 37A, 37B, and 37C (see FIG. 1). The imaging apparatus 30 is a so-called multispectral camera, and includes an imaging optical system 11 and an image sensor 20.

The imaging optical system 11 includes a fisheye lens 11A as an objective lens. By using the fisheye lens 11A, it is possible to image surroundings of the moving object 10 over a wide range. In addition, the image sensor 20 is an image sensor capable of imaging in a multispectral method.

Figure 3:
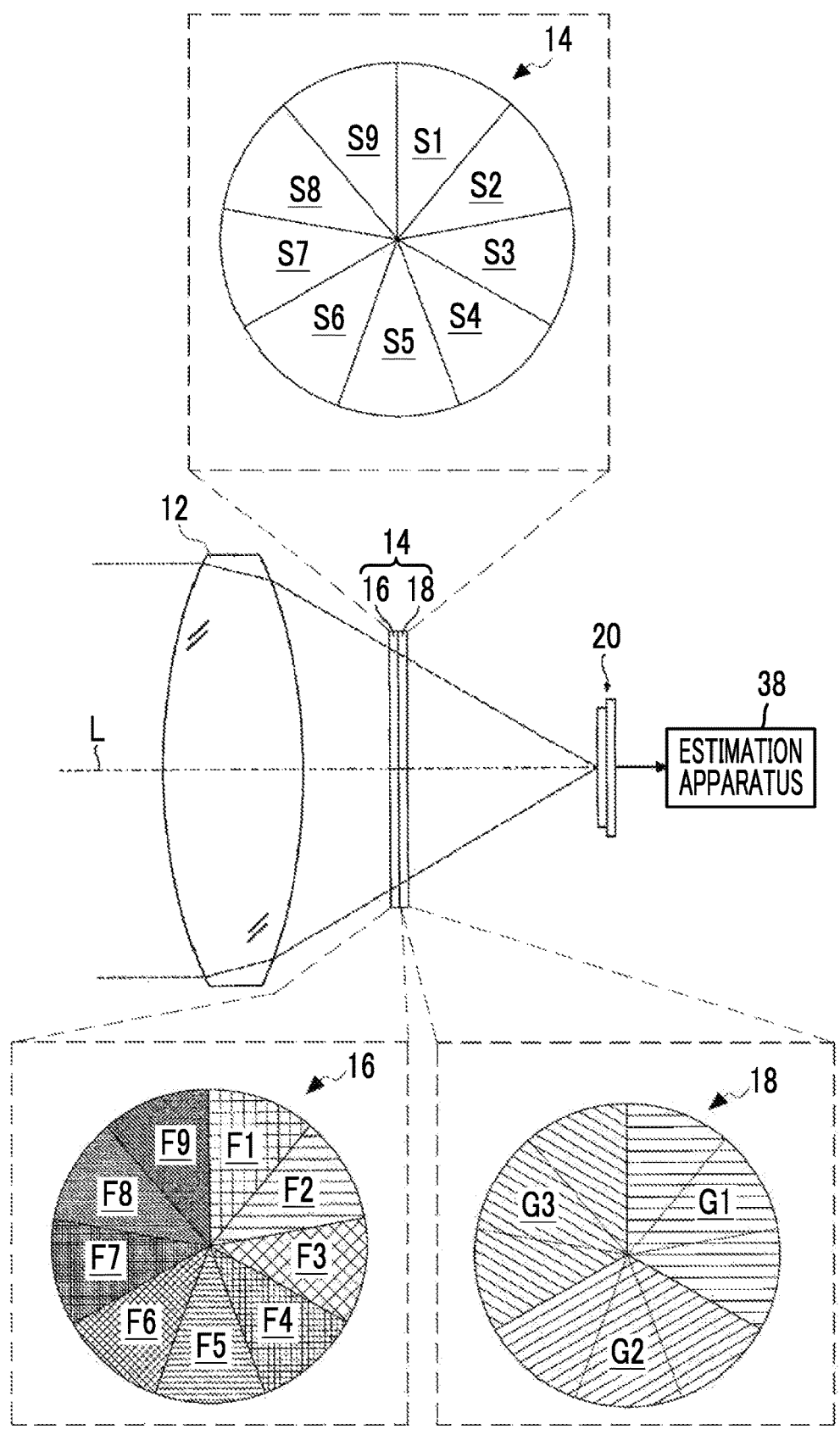
FIG. 3 is a schematic configuration diagram showing an example of a configuration of an optical system of an imaging apparatus.

In addition, the imaging optical system 11 comprises a lens 12 and a pupil division filter 14. The lens 12 causes an optical image of a subject including the target object to be formed on a light-receiving surface 20A of the image sensor 20. The pupil division filter 14 is comprised at or in a vicinity of a pupil position of the imaging optical system 11 and divides the pupil portion of the imaging optical system 11 into nine optical regions. As shown in FIG. 3 as an example, the pupil division filter 14 is a filter in which a narrowband filter 16 and a polarization filter 18 are superimposed. The pupil division filter 14 has nine optical regions $S_j$ (j=natural number from 1 to 9) equally divided into nine parts in a circumferential direction. The optical regions $S_j$ transmit light in different wavelength bands. In addition, among the nine optical regions $S_j$, an optical region group including optical regions $S_1$ to $S_3$, an optical region group including optical regions $S_4$ to $S_6$, and an optical region group including optical regions $S_7$ to $S_9$ transmit light in polarization directions different from each other (that is, transmitted polarization azimuths). The nine optical regions $S_j$ are realized by a combination of, for example, the narrowband filter 16 and the polarization filter 18.

The narrowband filter 16 includes nine narrowband filter units $F_1$ to $F_9$ equally divided into nine parts in the circumferential direction. The narrowband filter units $F_1$ to $F_9$ correspond to the optical regions $S_1$ to $S_9$ of the pupil division filter 14, respectively. Each of the narrowband filter units $F_1$ to $F_9$ includes a bandpass filter that allows transmission of light of different narrowbands.

That is, a first narrowband filter unit $F_1$ transmits light in a first wavelength band $\Delta f_1$. A second narrowband filter unit $F_2$ transmits light in a second wavelength band $\Delta f_2$. A third narrowband filter unit $F_3$ transmits light in a third wavelength band $\Delta f_3$. A fourth narrowband filter unit $F_4$ transmits light in a fourth wavelength band $\Delta f_4$. A fifth narrowband filter unit $F_5$ transmits light in a fifth wavelength band $\Delta f_5$. A sixth narrowband filter unit $F_6$ transmits light in a sixth wavelength band $\Delta f_6$. A seventh narrowband filter unit $F_7$ transmits light in a seventh wavelength band $\Delta f_7$. An eighth narrowband filter unit $F_8$ transmits light in an eighth wavelength band $\Delta f_8$. A ninth narrowband filter unit $F_9$ transmits light in a ninth wavelength band $\Delta f_9$.

The second wavelength band $\Delta f_2$ is a wavelength band corresponding to a wavelength band of a blue LED light source. A central wavelength of the second wavelength band $\Delta f_2$ matches a central wavelength of the blue LED light source (that is, 503 nm, and hereinafter, also simply referred to as "blue central wavelength"). In addition, a band width of the second wavelength band $\Delta f_2$ is preferably within a band width of the wavelength band of the blue LED light source. In the present embodiment, the term "match" means match including an error that is generally allowed in the technical field to which the technology of the present disclosure belongs and that does not deviate from the gist of the technology of the present disclosure, in addition to perfect match.

That is, the central wavelength of the second wavelength band $\Delta f_2$ does not need to completely match the blue central wavelength, and may be at least in a range of less than a half-width of a light emission spectrum of the blue LED light source from the blue central wavelength. The second wavelength band $\Delta f_2$ is an example of a "light emitter wavelength band" according to the technology of the present disclosure.

The first wavelength band $\Delta f_1$ has a central wavelength on a short wavelength side by a designated wavelength from the central wavelength of the second wavelength band $\Delta f_2$ (that is, the blue central wavelength). For example, the central wavelength of the first wavelength band $\Delta f_1$ is 503 nm-$\lambda_1$, which is shorter than the central wavelength of the second wavelength band $\Delta f_2$ by $\lambda_1$ (see FIG. 6). In addition, the third wavelength band Δf3 has a central wavelength on a long wavelength side by a designated wavelength from the central wavelength of the second wavelength band Δf2 (that is, the blue central wavelength). The central wavelength of the third wavelength band Δf3 is 503 nm+λ3, which is longer than the central wavelength of the second wavelength band Δf2 by λ3 (see FIG. 6). That is, unlike the first wavelength band Δf1 and the second wavelength band Δf2, the third wavelength band Δf3 is a wavelength band on an opposite side to the first wavelength band Δf1 with the second wavelength band Δf2 interposed therebetween in a light emission spectrum. The first wavelength band Δf1 is an example of a "first adjacent wavelength band" according to the technology of the present disclosure, and the third wavelength band Δf3 is an example of a "second adjacent wavelength band" according to the technology of the present disclosure.

In addition, it is preferable that each of λ1 and λ3 is a value separated by more than or equal to the half-width of the light emission spectrum of the blue LED light source from the central wavelength of the second wavelength band Δf2.

The fifth wavelength band Δf5 is a wavelength band corresponding to a wavelength band of a yellow LED light source. A central wavelength of the fifth wavelength band Δf5 matches a central wavelength of the yellow LED light source (that is, 592 nm, and hereinafter, also simply referred to as "yellow central wavelength"). A band width of the fifth wavelength band Δf5 is preferably within a band width of the wavelength band of the yellow LED light source.

The fourth wavelength band Δf4 and the sixth wavelength band Δf6 are wavelength bands on a short wavelength side and a long wavelength side, respectively, with the fifth wavelength band Δf5 interposed therebetween. A central wavelength of the fourth wavelength band Δf4 is 592 nm-λ4, and a central wavelength of the sixth wavelength band Δf6 is 592 nm+λ6 (see FIG. 6). It is preferable that each of λ4 and λ6 is a value separated by more than or equal to the half-width of the light emission spectrum of the yellow LED light source from the central wavelength of the fifth wavelength band Δf5.

The eighth wavelength band Δf8 is a wavelength band corresponding to a wavelength band of a red LED light source. A central wavelength of the eighth wavelength band Δf8 matches a central wavelength of the red LED light source (that is, 630 nm, and hereinafter, also simply referred to as "red central wavelength"). A band width of the eighth wavelength band Δf8 is preferably within a band width of the wavelength band of the red LED light source.

The seventh wavelength band Δf7 and the ninth wavelength band Δf9 are wavelength bands on a short wavelength side and a long wavelength side, respectively, with the eighth wavelength band Δf8 interposed therebetween. A central wavelength of the seventh wavelength band Δf7 is 630 nm-λ7, and a central wavelength of the ninth wavelength band Δf9 is 630 nm+λ9 (see FIG. 6). It is preferable that each of λ7 and λ9 is a value separated by more than or equal to the half-width of the light emission spectrum of the red LED light source from the central wavelength of the eighth wavelength band Δf8.

The polarization filter 18 has three polarization filter units G1 to G3 equally divided into three parts in the circumferential direction. A first polarization filter unit G1 corresponds to a first optical region S1 to a third optical region S3 of the pupil division filter 14. A second polarization filter unit G2 corresponds to a fourth optical region S4 to a sixth optical region S6 of the pupil division filter 14. A third polarization filter unit G3 corresponds to a seventh optical region S7 to a ninth optical region S9 of the pupil division filter 14.

The polarization filter units G1 to G3 transmit light in different polarization directions (that is, transmitted polarization azimuths). Here, a polarization direction of light transmitted by the first polarization filter unit G1 is denoted by α1. A polarization direction of light transmitted by the second polarization filter unit G2 is denoted by α2. A polarization direction of light transmitted by the third polarization filter unit G3 is denoted by α3. In the imaging apparatus 30, the first polarization filter unit G1 transmits light having an azimuthal angle of 0° (that is, α1=0°). The second polarization filter unit G2 transmits light having an azimuthal angle of 60° (that is, α2=60°). The third polarization filter unit G3 transmits light having an azimuthal angle of 120° (that is, α3=120°).

The pupil division filter 14 obtained by superimposing the narrowband filter 16 and the polarization filter 18 described above on the same axis acts as follows.

Light that passes through the first optical region S1 of the pupil division filter 14 passes through the first narrowband filter unit F1 of the narrowband filter 16 and the first polarization filter unit G1 of the polarization filter 18. Thus, light of the first wavelength band Δf1 is subjected to linear polarization in a polarization direction α1 and exits from the first optical region S1. Light that passes through the second optical region S2 of the pupil division filter 14 passes through the second narrowband filter unit F2 of the narrowband filter 16 and the first polarization filter unit G1 of the polarization filter 18. Thus, light of the second wavelength band Δf2 is subjected to linear polarization in the polarization direction α1 and exits from the second optical region S2. Light that passes through the third optical region S3 of the pupil division filter 14 passes through the third narrowband filter unit F3 of the narrowband filter 16 and the first polarization filter unit G1 of the polarization filter 18. Thus, light of the third wavelength band Δf3 is subjected to linear polarization in the polarization direction α1 and exits from the third optical region S3.

In addition, light that passes through the fourth optical region S4 of the pupil division filter 14 passes through the fourth narrowband filter unit F4 of the narrowband filter 16 and the second polarization filter unit G2 of the polarization filter 18. Thus, light of the fourth wavelength band Δf4 is subjected to linear polarization in a polarization direction α2 and exits from the fourth optical region S4. Light that passes through the fifth optical region S5 of the pupil division filter 14 passes through the fifth narrowband filter unit F5 of the narrowband filter 16 and the second polarization filter unit G2 of the polarization filter 18. Thus, light of the fifth wavelength band Δf5 is subjected to linear polarization in the polarization direction α2 and exits from the fifth optical region S5. Light that passes through the sixth optical region S6 of the pupil division filter 14 passes through the sixth narrowband filter unit F6 of the narrowband filter 16 and the second polarization filter unit G2 of the polarization filter 18. Thus, light of the sixth wavelength band Δf6 is subjected to linear polarization in the polarization direction α2 and exits from the sixth optical region S6.

In addition, light that passes through the seventh optical region S7 of the pupil division filter 14 passes through the seventh narrowband filter unit F7 of the narrowband filter 16 and the third polarization filter unit G3 of the polarization filter 18. Thus, light of the seventh wavelength band Δf7 is subjected to linear polarization in a polarization direction α3 and exits from the seventh optical region S7. Light that passes through the eighth optical region S8 of the pupil division filter 14 passes through the eighth narrowband filter unit F8 of the narrowband filter 16 and the third polarization filter unit G3 of the polarization filter 18. Thus, light of the eighth wavelength band Δf8 is subjected to linear polarization in the polarization direction α3 and exits from the eighth optical region S8. Light that passes through the ninth optical region S9 of the pupil division filter 14 passes through the ninth narrowband filter unit F9 of the narrowband filter 16 and the third polarization filter unit G3 of the polarization filter 18. Thus, light of the ninth wavelength band Δf9 is subjected to linear polarization in the polarization direction α3 and exits from the ninth optical region S9.

The entire imaging optical system 11 is disposed to be movable forward and rearward along the optical axis L. Therefore, focus is adjusted.

Figure 4:
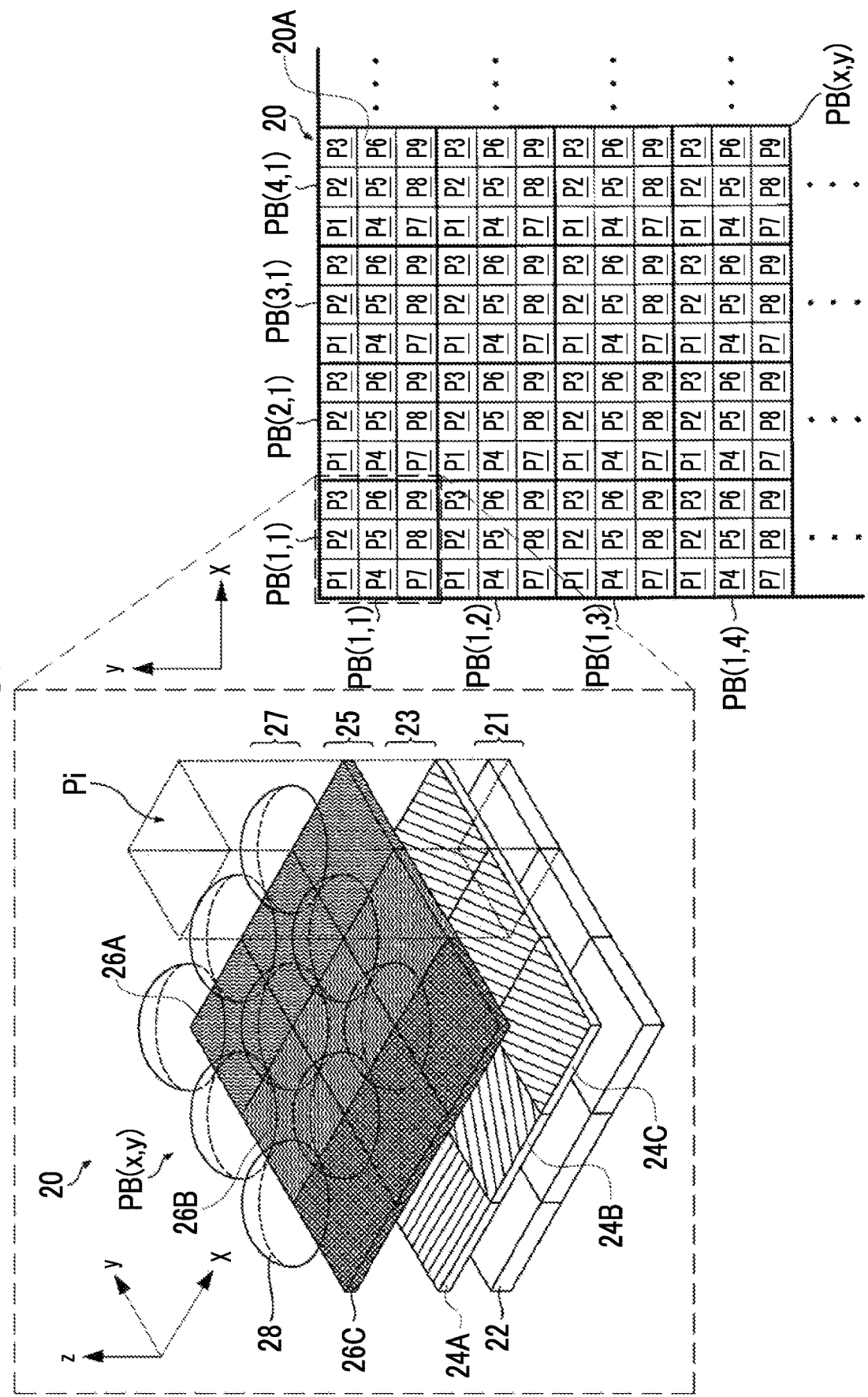
FIG. 4 is a schematic configuration diagram showing an example of a configuration of an image sensor.

As shown in FIG. 4 as an example, the image sensor 20 includes a plurality of pixels Pi (i=natural number from 1 to 9) on the light-receiving surface 20A. The pixels Pi are regularly arranged at a regular pitch along a horizontal direction (that is, an x direction shown in FIG. 4) and a vertical direction (that is, a y direction shown in FIG. 4).

The image sensor 20 has a pixel block PB including nine (that is, threexthree) adjacent pixels Pi. Hereinafter, for convenience of description, in a case of describing any pixel block PB, the pixel block PB will be referred to as PB(x, y). The notation of (x, y) indicates that a certain pixel block PB is arranged at an xth position in the horizontal direction (that is, the x direction shown in FIG. 4) and at a yth position in the vertical direction (that is, the y direction shown in FIG. 4).

The pixel block PB(x, y) is regularly arranged along the horizontal direction (that is, the x direction shown in FIG. 4) and the vertical direction (that is, the y direction shown in FIG. 4). The pixels Pi receive light having different characteristics.

The image sensor 20 has a pixel array layer 21, a polarization filter element array layer 23, a spectroscopic filter element array layer 25, and a microlens array layer 27. Each layer is arranged in an order of the pixel array layer 21, the polarization filter element array layer 23, the spectroscopic filter element array layer 25, and the microlens array layer 27 from an image plane side to an object side.

The pixel array layer 21 has multiple photodiodes 22 arranged two-dimensionally. One photodiode 22 corresponds to one pixel. Each photodiode 22 is regularly arranged along the horizontal direction (that is, the x direction shown in FIG. 4) and the vertical direction (that is, the y direction shown in FIG. 4).

The polarization filter element array layer 23 has three types of polarization filter elements 24A, 24B, and 24C having polarization directions (that is, transmitted polarization azimuths) different from each other. The polarization filter elements 24A, 24B, and 24C are two-dimensionally arranged. Each of the polarization filter elements 24A, 24B, and 24C is arranged at the same intervals as the pixel array layer 21. In addition, each of the polarization filter elements 24A, 24B, and 24C is comprised for each pixel. It is assumed that a polarization direction of light transmitted by a first polarization filter element 24A is β1, a polarization direction of light transmitted by a second polarization filter element 24B is β2, and a polarization direction of light transmitted by a third polarization filter element 24C is β3.

The first polarization filter element 24A transmits light having an azimuthal angle of 0° (that is, β1=0°. The second polarization filter element 24B transmits light having an azimuthal angle of 60° (that is, β2=60°). The third polarization filter element 24C transmits light having an azimuthal angle of 120° (that is, β3=120°.

In each pixel block PB(x, y), the polarization filter elements 24A, 24B, and 24C are regularly arranged. The first polarization filter element 24A is arranged in a first pixel P1, a fourth pixel P4, and a seventh pixel P7, which are pixels in the first column in the pixel block PB(x,y). The second polarization filter element 24B is arranged in a second pixel P2, a fifth pixel P5, and an eighth pixel P8, which are pixels in the second column in the pixel block PB(x,y). The third polarization filter element 24C is arranged in a third pixel P3, a sixth pixel P6, and a ninth pixel P9, which are pixels in the third column in the pixel block PB(x,y).

The spectroscopic filter element array layer 25 has three types of spectroscopic filter elements 26A, 26B, and 26C having spectroscopic transmittances different from each other. The spectroscopic filter elements 26A, 26B, and 26C are two-dimensionally arranged. The spectroscopic filter elements 26A, 26B, and 26C are arranged at the same interval as the photodiodes 22, and are arranged in each pixel.

The spectroscopic filter elements 26A, 26B, and 26C allow transmission of light transmitted through each of the narrowband filter units F1 to F9 of the narrowband filter 16 with different transmittances. A first spectroscopic filter element 26A has a characteristic of transmitting a larger amount of light in a short wavelength band of a wavelength band of visible light. A second spectroscopic filter element 26B has a characteristic of transmitting a larger amount of light in an intermediate wavelength band. A third spectroscopic filter element 26C has a characteristic of transmitting a larger amount of light in a long wavelength band. For example, the spectroscopic filter elements 26A, 26B, and 26C may be color filters of B, G, and R disposed in a general color image sensor.

In each pixel block PB(x, y), the spectroscopic filter elements 26A, 26B, and 26C are regularly arranged. The first spectroscopic filter element 26A is arranged in the first pixel P1, the second pixel P2, and the third pixel P3, which are pixels in the first row in the pixel block PB(x,y). The second spectroscopic filter element 26B is arranged in the fourth pixel P4, the fifth pixel P5, and the sixth pixel P6, which are pixels in the second row in the pixel block PB(x,y). The third spectroscopic filter element 26C is arranged in the seventh pixel P7, the eighth pixel P8, and the ninth pixel P9, which are pixels in the third row in the pixel block PB(x,y).

The microlens array layer 27 has a large number of microlenses 28 arranged two-dimensionally. Each of the microlenses 28 is arranged at the same interval as the photodiodes 22 and is comprised in each pixel. The microlenses 28 are arranged for a purpose of efficiently condensing light from the imaging optical system 11 on the photodiodes 22.

In the image sensor 20 described above, in each pixel block PB(x,y), each pixel Pi has different combinations of the spectroscopic filter elements 26A, 26B, and 26C and the polarization filter elements 24A, 24B, and 24C. Accordingly, in the pixel Pi in the pixel block PB(x,y), light having different characteristics is received.

Meanwhile, in a case where the light emitter 37 is imaged by the imaging apparatus 30 to estimate the position and the posture of the moving object 10, it is necessary to specify an image 50 (hereinafter, also referred to as a "light emitter image 50") indicating the light emitter 37 in an image obtained by imaging an imaging scene including the light emitter 37. However, depending on imaging conditions (for example, a distance from the moving object 10 to the light emitter 37, brightness of the periphery in a case of imaging, or the like), it may be difficult to distinguish the light emitter image 50 from a subject image other than the light emitter 37 in the image obtained by imaging the imaging scene.

Figure 5:
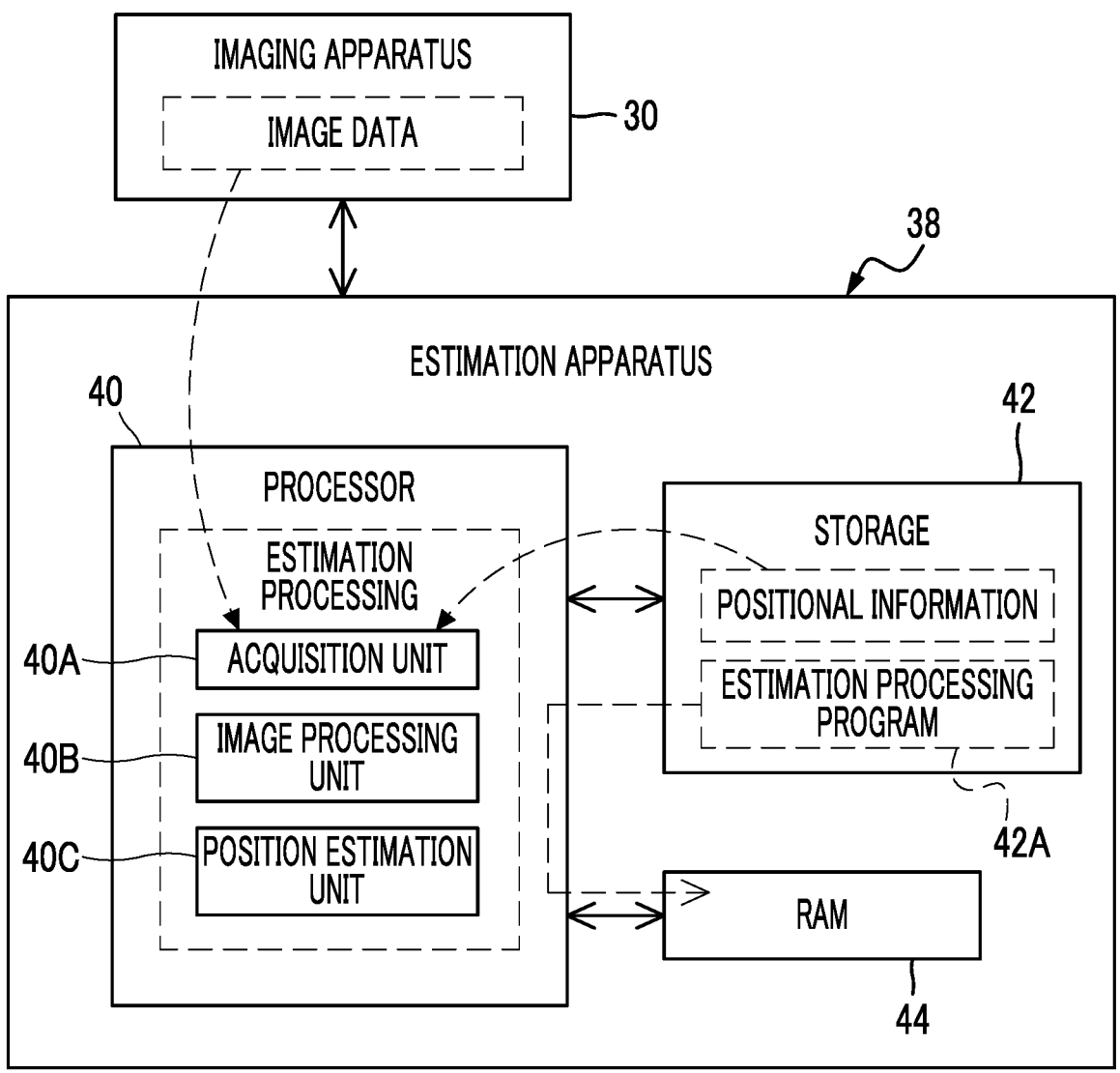
FIG. 5 is a block diagram showing an example of functions of main units of a processor.

In view of these circumstances, in the present embodiment, for example, as shown in FIG. 5, the processor 40 of the estimation apparatus 38 performs estimation processing. An estimation processing program 42A is stored in the storage 42. The processor 40 reads out the estimation processing program 42A from the storage 42 and executes the read-out estimation processing program 42A on the RAM 44 to perform estimation processing. The estimation processing is realized by the processor 40 operating as an acquisition unit 40A, an image processing unit 40B, and an estimation unit 40C. The estimation processing program 42A is an example of a "program" according to the technology of the present disclosure.

The acquisition unit 40A acquires positional information of the reference station 36 from the storage 42. The storage 42 stores positional information acquired via the external I/F 46 in advance. The positional information of the reference station 36 is obtained, for example, by converting a longitude, a latitude, and an altitude, which are GNSS coordinates of the reference station 36, into coordinates of a three-dimensional orthogonal coordinate system. Here, a use of the coordinates converted into the three-dimensional orthogonal coordinate system as the positional information of the reference station 36 is merely an example. For example, the GNSS coordinates of the reference station 36 may be used as positional information as they are.

The acquisition unit 40A acquires image data from the imaging apparatus 30. The image data is data indicating an image in which the imaging scene is included as an image. The image data is obtained by imaging the imaging scene via the imaging apparatus 30. The image data includes a plurality of image data groups indicating images obtained by imaging an imaging scene around the moving object 10 in a plurality of the wavelength bands. That is, the image data includes the plurality of image data groups obtained by imaging the imaging scene in each of the first wavelength band $\Delta f1$, the second wavelength band $\Delta f2$, the third wavelength band $\Delta f3$, the fourth wavelength band $\Delta f4$, the fifth wavelength band $\Delta f5$, the sixth wavelength band $\Delta f6$, the seventh wavelength band $\Delta f7$, the eighth wavelength band $\Delta f8$, and the ninth wavelength band $\Delta f9$.

The image processing unit 40B performs image processing for specifying the light emitter 37 included as an image in the image indicated by the image data acquired by the acquisition unit 40A. First, a case where the light emitter image 50A indicating the first light emitter 37A, which is a blue LED light source, is specified in the image will be described as an example.

Figure 6:
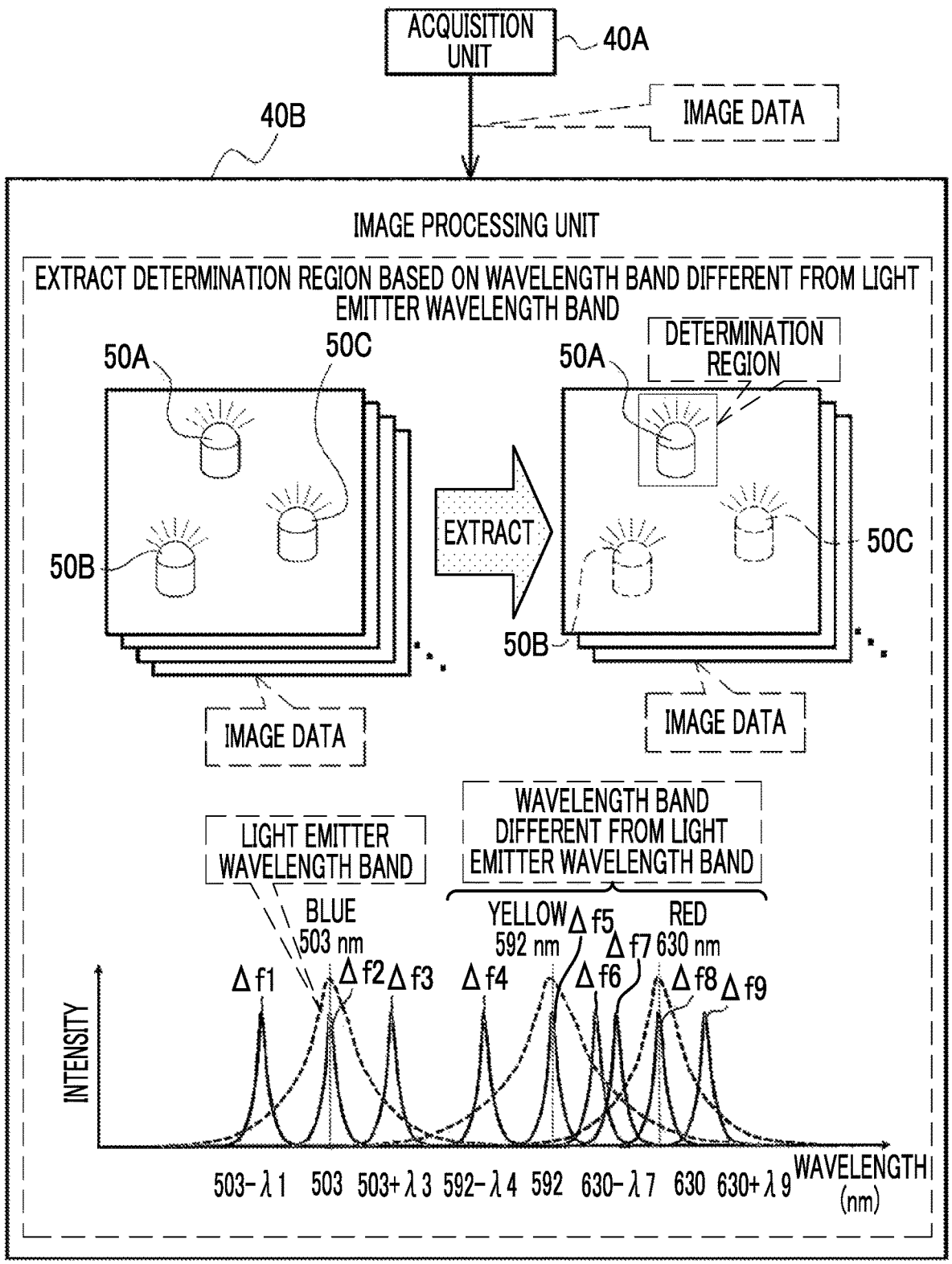
FIG. 6 is a conceptual diagram showing an example of processing contents of an image processing unit.

As shown in FIG. 6 as an example, first, the image processing unit 40B extracts a determination region including the light emitter image 50, based on six pieces of image data of the fourth wavelength band $\Delta f4$ to the ninth wavelength band $\Delta f9$. The six pieces of image data of the fourth wavelength band $\Delta f4$ to the ninth wavelength band $\Delta f9$ are image data not including the blue light emission spectrum emitted from the first light emitter 37A among nine pieces of image data of the first wavelength band $\Delta f1$ to the ninth wavelength band $\Delta f9$. In the present embodiment, the concept of "not including" also includes concept of "not including" in a sense including an error generally allowed in the technical field to which the technology of the present disclosure belongs, which is the error to the extent that it does not contradict the purpose of the technology of the present disclosure, in addition to the concept of exactly "not including".

The image processing unit 40B performs non-determination region determination processing of determining a region in which the light emitter image 50A is not present as a non-determination region, based on the six pieces of image data of the fourth wavelength band $\Delta f4$ to the ninth wavelength band $\Delta f9$. The fourth wavelength band $\Delta f4$ to the ninth wavelength band $\Delta f9$ are examples of a "wavelength band different from the light emitter wavelength band" according to the technology of the present disclosure. The six pieces of image data of the fourth wavelength band $\Delta f4$ to the ninth wavelength band $\Delta f9$ are examples of "sixth image data" according to the technology of the present disclosure.

For example, for a certain pixel Pi, six pieces of pixel data (that is, pixel values) of a position corresponding to the pixel Pi are obtained from the six pieces of image data of the fourth wavelength band $\Delta f4$ to the ninth wavelength band $\Delta f9$ that do not include a light emission spectrum of the first light emitter 37A among the nine pieces of image data. In a case where even one of the obtained six pieces of pixel data exceeds a threshold value, the position corresponding to the pixel Pi is determined as a region in which the light emitter image 50A is not present (hereinafter, also referred to as a "non-determination region"). The determination of the non-determination region in which the light emitter image 50A is not present is realized by determining whether or not the position corresponding to the pixel Pi is the non-determination region for all the pixel data of the image data indicating the imaging scene via the image processing unit 40B.

The image processing unit 40B extracts a region obtained by excluding the non-determination region from the imaging scene as a determination region in which the light emitter image 50A may be present, based on a result of determining the non-determination region in which the light emitter image 50A is not present.

Figure 7:
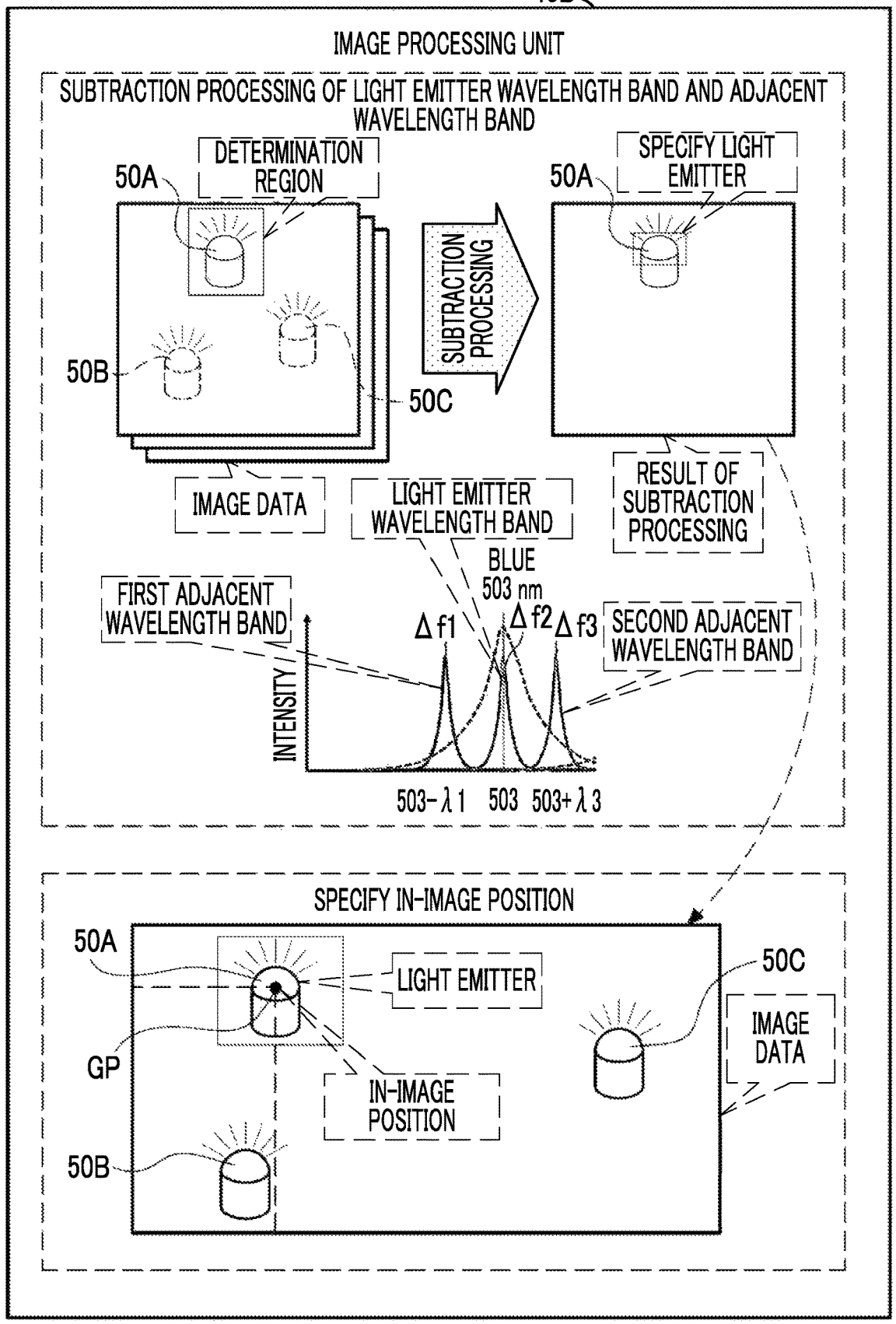
FIG. 7 is a conceptual diagram showing an example of the processing contents of the image processing unit.

The image processing unit 40B determines whether or not a target shown in the determination region is the light emitter image 50A for the extracted determination region. As shown in FIG. 7 as an example, the image processing unit 40B determines whether or not a target in the determination region is the light emitter image 50A, based on three pieces of image data of the first wavelength band $\Delta f1$ to the third wavelength band $\Delta f3$.

Meanwhile, it is considered that an image indicating another light source or a reflecting object that emits blue light is present in the determination region, in addition to the light emitter image 50A. However, even in a case where the light is blue, the other light source or the reflecting object emitting blue light does not emit light of a narrowband having a central wavelength of 503 nm and a wavelength width of approximately 30 to 50 nm unlike the blue LED light source.

Therefore, the image processing unit 40B subtracts the image data of the second wavelength band $\Delta f2$ in which the central wavelength matches the blue central wavelength and the image data of the first wavelength band $\Delta f1$, which has the central wavelength on the short wavelength side by the designated wavelength from the central wavelength of the second wavelength band $\Delta f2$. For example, the image processing unit 40B subtracts the image data of the first wavelength band $\Delta f1$ from the image data of the second wavelength band $\Delta f2$. The image processing unit 40B determines whether or not the target in the determination region is the light emitter image 50A based on a result of the subtraction processing. The image data of the second wavelength band Δf2 is an example of "first image data" according to the technology of the present disclosure, and the image data of the first wavelength band Δf1 is an example of "second image data" according to the technology of the present disclosure.

Similarly, the image processing unit 40B subtracts the image data of the second wavelength band Δf2 in which the central wavelength matches the blue central wavelength and the image data of the third wavelength band Δf3, which has the central wavelength on the long wavelength side by the designated wavelength from the central wavelength of the second wavelength band Δf2. For example, the image processing unit 40B subtracts the image data of the third wavelength band Δf3 from the image data of the second wavelength band Δf2. The image processing unit 40B determines whether or not the target shown in the determination region is the light emitter image 50A based on a result of the subtraction processing. The image data of the third wavelength band Δf3 is an example of "third image data" according to the technology of the present disclosure.

In a case where the target in the determination region is the light emitter image 50A, a light emission intensity in the subtraction result is not significantly reduced. On the other hand, in a case of another light source or the reflecting object that does not have a light emission spectrum such as a blue LED light source, the light emission intensity in the subtraction result becomes significantly smaller or a negative value. Therefore, the image processing unit 40B can determine whether or not the target shown in the determination region is the light emitter image 50A from the result of the subtraction processing.

In addition, the image processing unit 40B performs the image processing in the same manner as a case where the first light emitter 37A is specified, even in a case where the second light emitter 37B that is a yellow LED light source is specified. That is, first, the image processing unit 40B extracts the determination region based on six pieces of image data of the first wavelength band Δf1 to the third wavelength band Δf3 and the seventh wavelength band Δf7 to the ninth wavelength band Δf9. Further, the image processing unit 40B subtracts, in the extracted determination region, the image data of the fifth wavelength band Δf5 in which the central wavelength matches the yellow central wavelength and the image data of the fourth wavelength band Δf4, which has the central wavelength on the short wavelength side by the designated wavelength from the central wavelength of the fifth wavelength band Δf5. In addition, the image processing unit 40B subtracts the image data of the fifth wavelength band Δf5 in which the central wavelength matches the yellow central wavelength and the image data of the sixth wavelength band Δf6, which has the central wavelength on the long wavelength side by the designated wavelength from the central wavelength of the fifth wavelength band Δf5. The image processing unit 40B determines whether or not the target shown in the determination region is an image 50B indicating the second light emitter 37B based on a result of the subtraction processing.

In addition, the image processing unit 40B performs the image processing in the same manner as a case where the first light emitter 37A and the second light emitter 37B are specified, even in a case where the third light emitter 37C that is a red LED light source is specified. That is, first, the image processing unit 40B extracts the determination region based on six pieces of image data of the first wavelength band Δf1 to the sixth wavelength band Δf6. Further, the image processing unit 40B subtracts, in the extracted determination region, the image data of the eighth wavelength band Δf8 in which the central wavelength matches a red central wavelength and the image data of the seventh wavelength band Δf7, which has the central wavelength on the short wavelength side by the designated wavelength from the central wavelength of the eighth wavelength band Δf8. In addition, the image processing unit 40B subtracts the image data of the eighth wavelength band Δf8 in which the central wavelength matches the red central wavelength and the image data of the ninth wavelength band Δf9, which has the central wavelength on the long wavelength side by the designated wavelength from the central wavelength of the eighth wavelength band Δf8. The image processing unit 40B determines whether or not the target shown in the determination region is an image 50C indicating the third light emitter 37C based on a result of the subtraction processing.

The image processing unit 40B specifies an in-image position GP (hereinafter, also simply referred to as an "in-image position GP") that is a position of the light emitter image 50 in an image, based on a result of specifying the light emitter image 50. Specifying the in-image position GP refers to calculating two-dimensional coordinates of a pixel forming the light emitter image 50 in the image indicated by the image data. In the example shown in FIG. 7, an example in which the in-image position GP of the light emitter image 50A is specified is shown.

Figure 8:
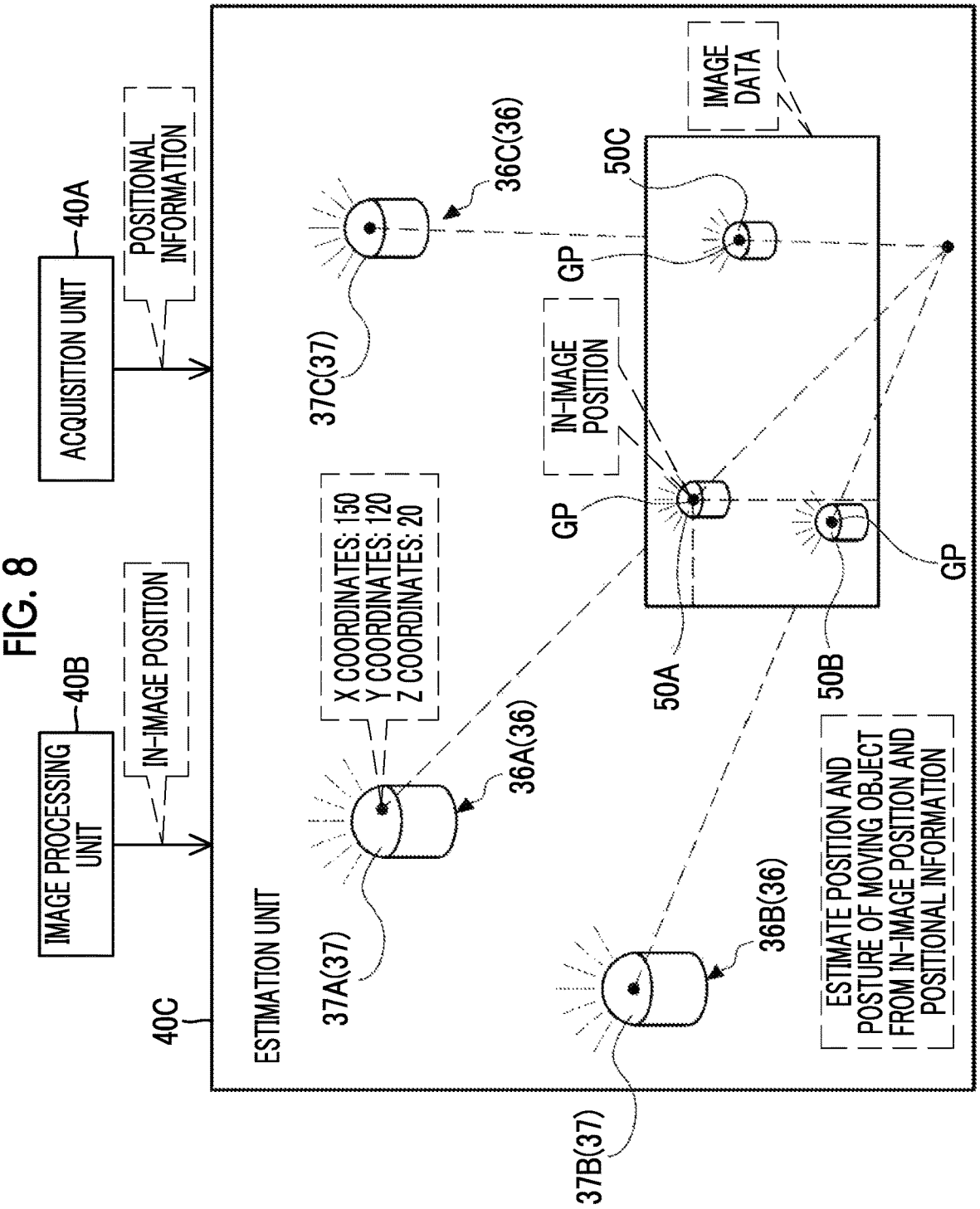
FIG. 8 is a conceptual diagram showing an example of processing contents of an estimation unit.

As shown in FIG. 8 as an example, the estimation unit 40C acquires the in-image position GP calculated by the image processing unit 40B. In addition, the estimation unit 40C acquires the positional information of the reference station 36 from the acquisition unit 40A.

In addition, the estimation unit 40C estimates the position and the posture of the moving object 10 based on the positional information of the reference station 36 and the in-image position GP. Estimating the position and the posture of the moving object 10 refers to calculating position coordinates of the moving object 10 in a three-dimensional orthogonal coordinate system in a three-dimensional space, as well as a roll angle, a pitch angle, and a yaw angle of the moving object 10.

Figure 9:
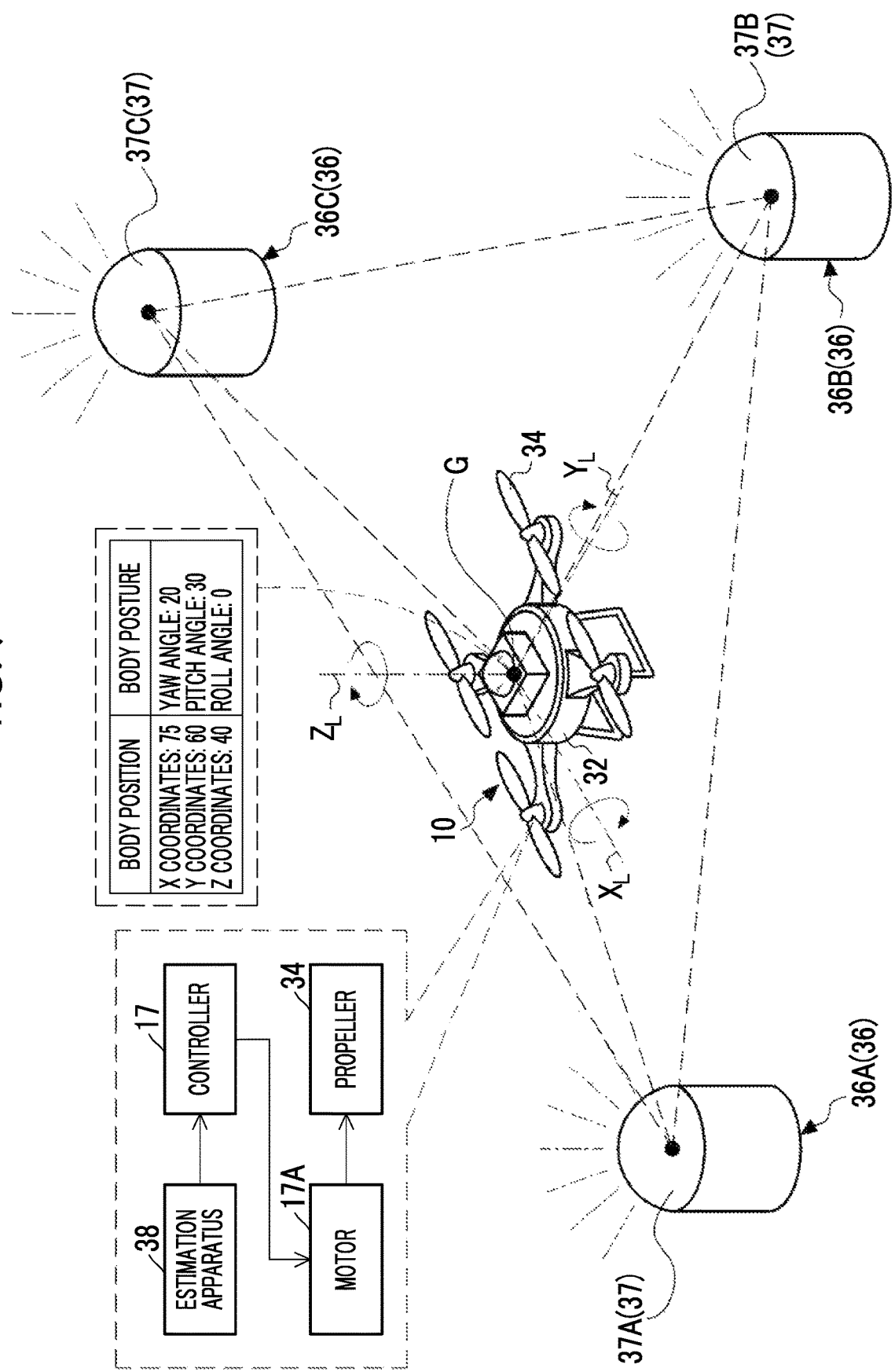
FIG. 9 is a conceptual diagram showing an example of estimation of a position and a posture of the moving object.

In a case of estimating a position and a posture of an object based on the position of the object in a three-dimensional space and the position of the object in an in-image coordinate system, the position and the posture of the object can be estimated by generally solving a perspective n-point problem (PnP problem). For example, the position and the posture of the moving object 10 are estimated by using a solution described in "Nakano et al., 'Unified Solution for PnP Problem of General Camera Model Using Gröbner Basis', Meeting on Image Recognition and Understanding (MIRU2011), pp. 845 to 851, 2011". The estimation unit 40C estimates the position and the posture of the moving object 10 by using an arithmetic expression in which the in-image position GP and the positional information (for example, three-dimensional orthogonal coordinates) of the reference station 36 corresponding to the light emitter 37 are used as independent variables and the position coordinates and Euler angles of the moving object 10 in the three-dimensional orthogonal coordinate system are used as dependent variables. The method of estimating the position and the posture of the moving object 10 described here is merely an example, and various solutions to the PnP problem may be appropriately used as the method of estimating the position and the posture of the moving object 10. Further, in estimating the posture of the moving object 10, the posture of the moving object 10 may be estimated as the posture in a body coordinate system by converting an inertial coordinate system into the body coordinate system using a direction cosine matrix. FIG. 9 shows, as an example of the body coordinate system, a coordinate system having a centroid G of the moving object 10 as an origin and consisting of an axis $X_L$, an axis $Y_L$, and an axis $Z_L$.

In a case where the position and the posture of the moving object 10 are estimated, as shown in FIG. 9 as an example, the estimation apparatus 38 outputs a result of estimating the position and the posture of the moving object 10 to the controller 17. The controller 17 controls the position and the posture of the moving object 10 based on the result of estimating the position and the posture of the moving object 10. For example, in a case where the moving object 10 is at a position deviating from a predetermined route, the controller 17 controls an operation of the motor 17A such that the moving object 10 returns to the predetermined route.

Next, an operation of the estimation apparatus 38 will be described with reference to FIGS. 10 and 11.

Figure 10:
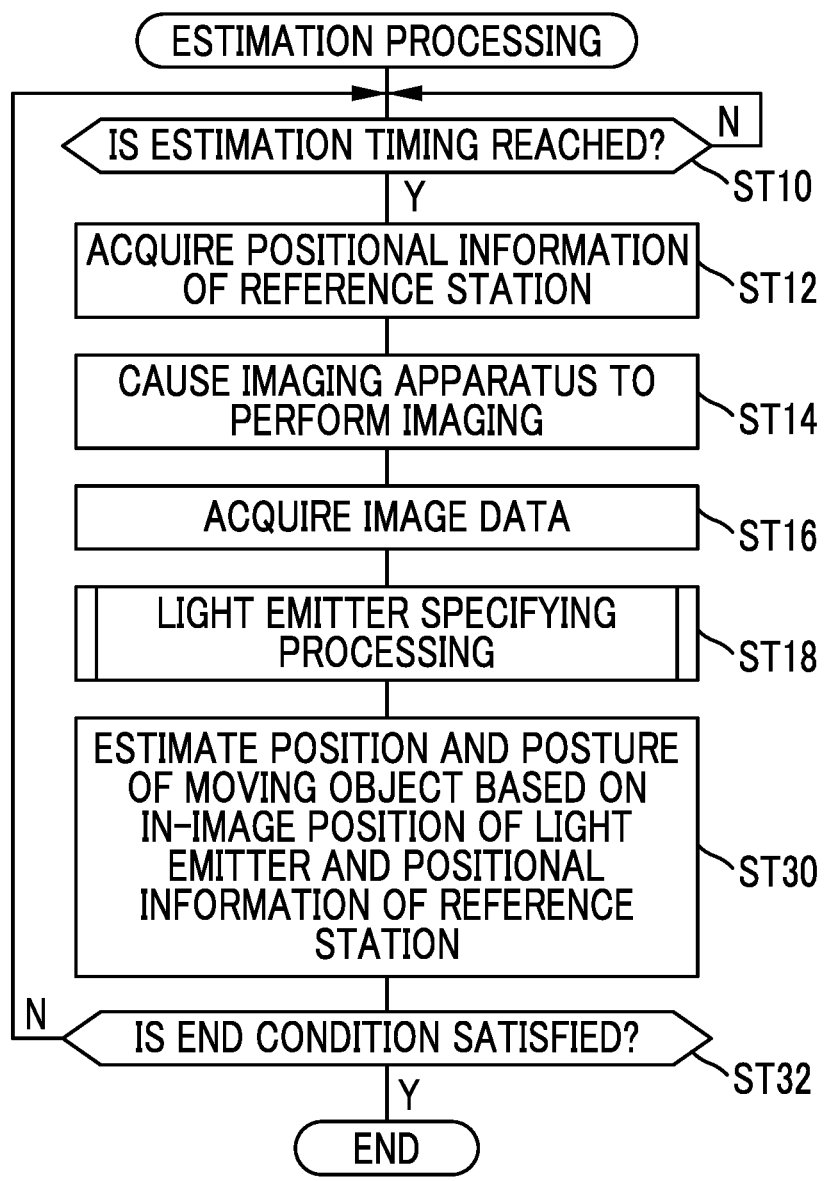
FIG. 10 is a flowchart showing an example of a flow of estimation processing.
Figure 11:
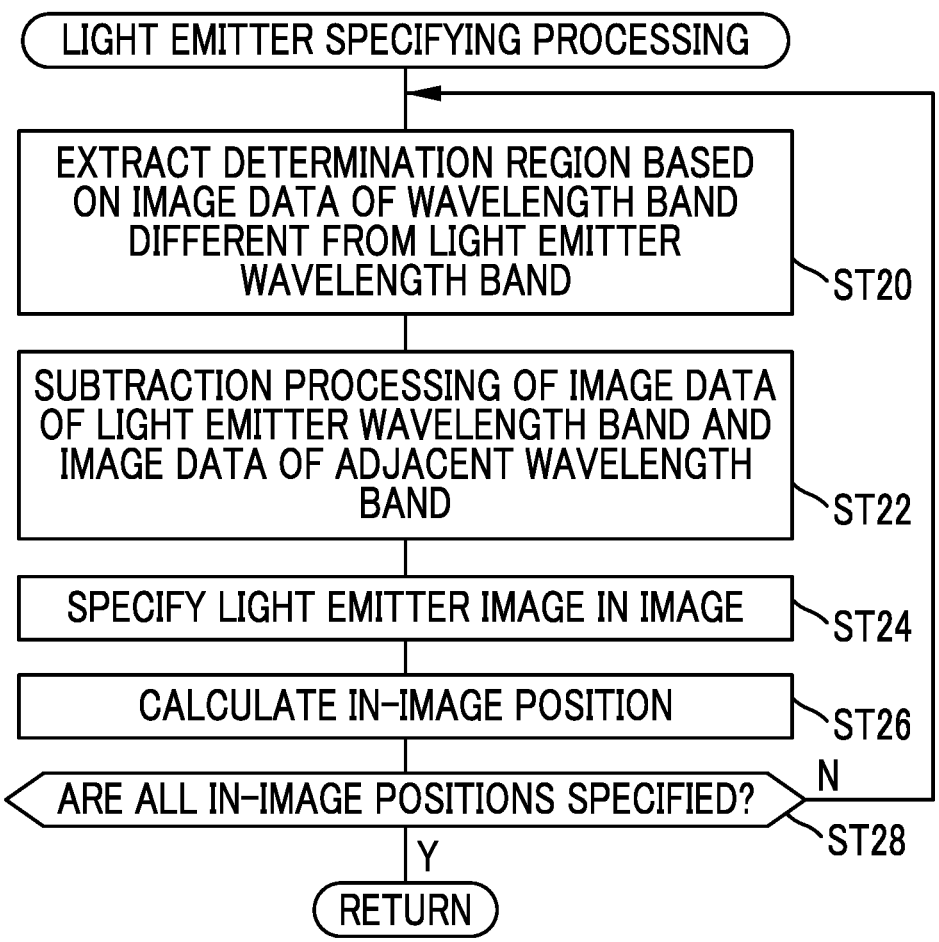
FIG. 11 is a flowchart showing an example of a flow of light emitter specifying processing.

In FIGS. 10 and 11, an example of a flow of the estimation processing performed by the processor 40 is shown. It should be noted that the flow of the estimation processing shown in FIGS. 10 and 11 is an example of an "estimation method" according to the technology of the present disclosure.

As an example, in the estimation processing shown in FIG. 10, first, in step ST10, the acquisition unit 40A determines whether or not an estimation timing for estimating the position and the posture of the moving object 10 is reached. Examples of the estimation timing include a condition that a predetermined time has elapsed from a time point at which a previous estimation is performed. In step ST10, in a case where the estimation timing is not reached, a negative determination is made, and the estimation processing transitions to step ST10. In step ST10, in a case where the estimation timing is reached, a positive determination is made, and the estimation processing transitions to step ST12.

In step ST12, the acquisition unit 40A acquires the positional information of the reference station 36 from the storage 42. After the processing of step ST12 is executed, the estimation processing transitions to step ST14.

In step ST14, the acquisition unit 40A causes the imaging apparatus 30 to image the imaging scene. After the processing of step ST14 is executed, the estimation processing transitions to step ST16.

In step ST16, the acquisition unit 40A acquires the image data obtained by causing the imaging apparatus 30 to image the imaging scene in step ST14. After the processing of step ST16 is executed, the estimation processing transitions to step ST18.

In step ST18, the image processing unit 40B performs the light emitter specifying processing shown in FIG. 11 as an example. In the light emitter specifying processing shown in FIG. 11, first, in step ST20, the image processing unit 40B extracts the determination region, based on the image data obtained by imaging in the wavelength band different from the wavelength band in which the light emitter 37 emits light. After the processing of step ST20 is executed, the light emitter specifying processing transitions to step ST22.

In step ST22, the image processing unit 40B performs subtraction processing, in the determination region extracted in step ST20, on image data obtained by imaging in a wavelength band in which the light emitter 37 emits light and image data obtained by imaging in a wavelength band, which has a central wavelength on a short wavelength side or a long wavelength side from a central wavelength of the wavelength band in which the light emitter 37 emits light. After the processing of step ST22 is executed, the light emitter specifying processing transitions to step ST24.

In step ST24, the image processing unit 40B specifies the light emitter image 50 in the image based on a subtraction result calculated in step ST22. After the processing of step ST24 is executed, the light emitter specifying processing transitions to step ST26.

In step ST26, the image processing unit 40B calculates the in-image position GP based on a result of specifying the light emitter image 50 in step ST24. After the processing of step ST26 is executed, the light emitter specifying processing transitions to step ST28.

In step ST28, the image processing unit 40B determines whether or not all the in-image positions GP are specified. In step ST28, in a case in which all the in-image positions GP are not specified, a negative determination is made, and the light emitter specifying processing transitions to step ST20. In step ST28, in a case in which all the in-image positions GP are specified, a positive determination is made, and the light emitter specifying processing transitions to step ST30 of the estimation processing shown in FIG. 10 as an example.

In step ST30, the estimation unit 40C estimates the position and the posture of the moving object 10, based on the in-image position GP calculated by the image processing unit 40B and the positional information of the reference station 36 acquired by the acquisition unit 40A. After the processing of step ST30 is executed, the estimation processing transitions to step ST32.

In step ST32, the estimation unit 40C determines whether or not a condition for ending the estimation processing (hereinafter, referred to as an "end condition") is satisfied. An example of the end condition includes a condition that the moving object 10 ends the movement along a predetermined route. In step ST32, in a case in which the end condition is not satisfied, a negative determination is made, and the estimation processing transitions to step ST10. In step ST32, in a case in which the end condition is satisfied, a positive determination is made, and the estimation processing ends.

As described above, in the moving object 10 according to the present embodiment, it is realized to estimate at least one of the position or the posture of the moving object 10 even in an environment in which the use of the GNSS is difficult.

In addition, in the moving object 10, for example, in a case where the light emitter 37 is a blue LED light source, the in-image position GP is specified based on a result of subtraction processing of the image data obtained by imaging in the second wavelength band $\Delta f2$ and the image data obtained by imaging in the first wavelength band $\Delta f1$. Therefore, with the present configuration, it is realized to specify the in-image position GP more accurately and more quickly than a case in which the in-image position GP is specified by using only the image data obtained by imaging in the second wavelength band $\Delta f2$.

In addition, in the moving object 10, for example, in a case where the light emitter 37 is a blue LED light source, the in-image position GP is specified based on a result of subtraction processing of the image data obtained by imaging in the second wavelength band $\Delta f2$ and the image data obtained by imaging in the third wavelength band $\Delta f3$. Therefore, with the present configuration, it is realized to specify the in-image position GP more accurately and more quickly than a case in which the in-image position GP is specified by using only the image data obtained by imaging in the second wavelength band $\Delta f2$.

In addition, in the moving object 10, for example, in a case where the light emitter 37 is a blue LED light source, the in-image position GP is specified based on six pieces of image data of the fourth wavelength band Δf4 to the ninth wavelength band Δf9, which are wavelength bands different from the second wavelength band Δf2. Therefore, with the present configuration, it is realized to specify the in-image position GP more accurately and more quickly than a case in which the in-image position GP is specified by using only the image data obtained by imaging in the second wavelength band Δf2.

In addition, in the moving object 10, the positional information is obtained by converting a latitude, a longitude, and an altitude of each of the plurality of reference stations 36 into coordinates in a three-dimensional orthogonal coordinate system. Therefore, with the present configuration, as compared with a case in which the latitude, the longitude, and the altitude are used as they are as the positional information of the reference station 36, a calculation required for estimating the position and the posture of the moving object 10 is facilitated, and at least one of the position or the posture of the moving object 10 can be estimated more quickly.

In addition, in the moving object 10, since the position and the posture of the moving object 10 are estimated by using three or more reference stations 36, at least one of the position or the posture of the moving object 10 can be more accurately estimated as compared with a case where the number of the reference stations 36 is less than three.

In addition, in the moving object 10, since the imaging apparatus 30 comprises the image sensor 20 capable of imaging in a multispectral method, the in-image position GP can be specified more accurately and more quickly than a case where the image sensor 20 is not capable of imaging in a multispectral method.

Second Embodiment

In the first embodiment, although the form example in which the estimation apparatus 38 is provided in the moving object 10 and the estimation processing of the position and the posture is performed in the moving object 10 has been described, the technology of the present disclosure is not limited to this. In the present second embodiment, the estimation processing is executed in an information processing apparatus 71 provided outside a moving object 10A.

Figure 12:
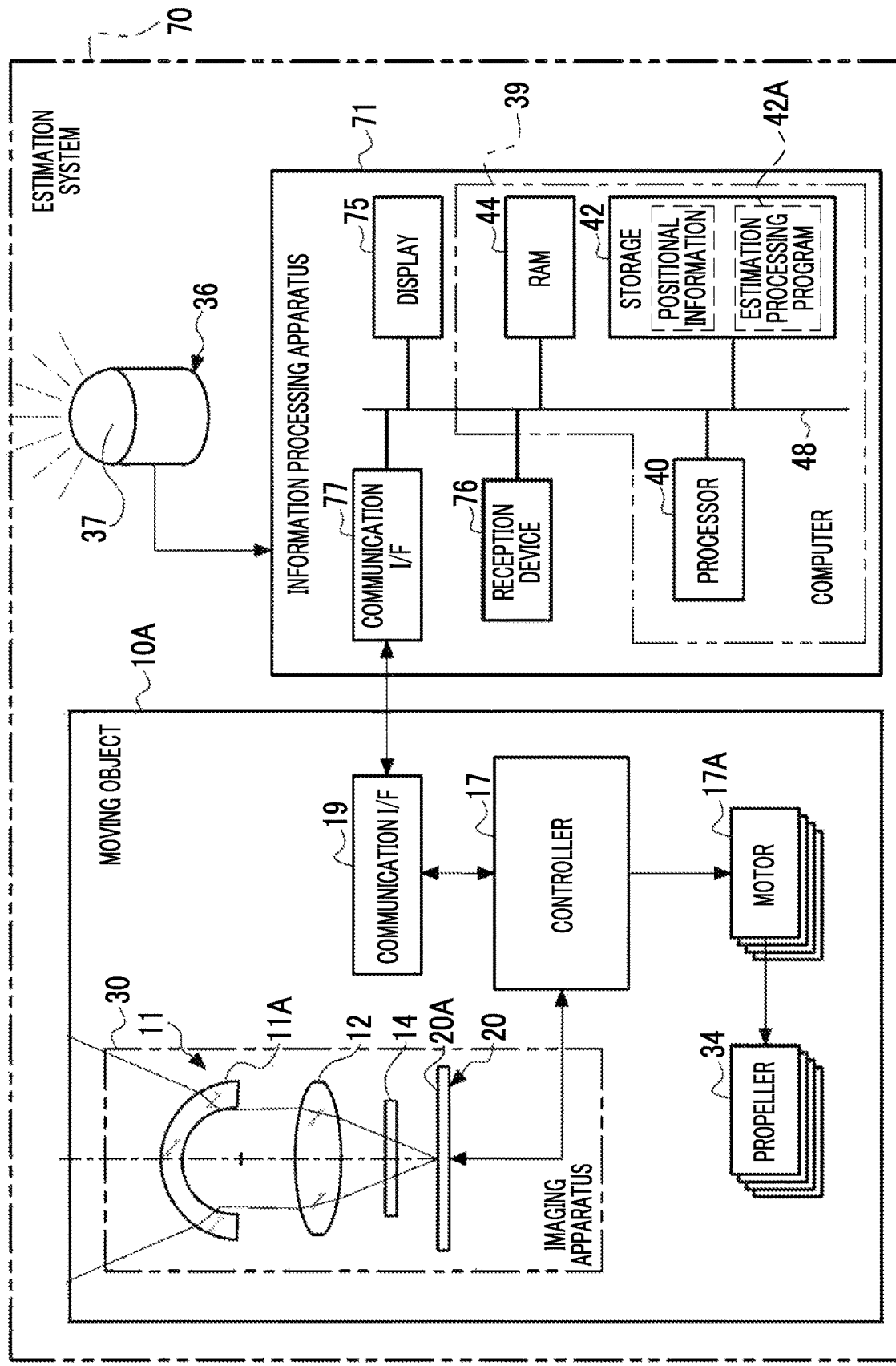
FIG. 12 is a block diagram showing an example of a hardware configuration of an estimation system.

As shown in FIG. 12 as an example, an estimation system 70 includes the moving object 10A, the reference station 36, and the information processing apparatus 71. The estimation system 70 is an example of an "estimation system" according to the technology of the present disclosure. The information processing apparatus 71 is an example of an "estimation apparatus" according to the technology of the present disclosure. The information processing apparatus 71 is, for example, a notebook personal computer, but is merely an example, and may be a tablet terminal or a smartphone, or may be a desktop personal computer. In addition, it is not limited to a personal computer and may be a server. The server may be a mainframe used on-premises together with the moving object 10A or may be an external server implemented by cloud computing. In addition, the server may be an external server implemented by network computing such as fog computing, edge computing, or grid computing. The information processing apparatus 71 may be a terminal for operating the moving object 10A.

The information processing apparatus 71 comprises a reception device 76 and a display 75. The reception device 76 has a keyboard, a mouse, a touch panel, and the like, and receives an instruction from a user. The display 75 displays various types of information (for example, an image and a character). Examples of the display 75 include an EL display (for example, an organic EL display or an inorganic EL display). It should be noted that the display is not limited to the EL display, and another type of display, such as a liquid crystal display, may be applied.

The moving object 10A is wirelessly communicatively connected to the information processing apparatus 71, and various types of information are wirelessly exchanged between the moving object 10A and the information processing apparatus 71. For example, in a case where the moving object 10A is performing an inspection in the tunnel, the information processing apparatus 71 is installed within a distance in which wireless communication is possible with the moving object 10A in the tunnel being inspected by the moving object 10A. A communication I/F 77 performs wireless communication with a communication I/F 19 of the moving object 10A to receive image data from the moving object 10A. The image data received via the communication I/F 77 is acquired and processed by the processor 40.

The information processing apparatus 71 acquires the positional information of the reference station 36. A method of acquiring the positional information of the reference station 36 is not particularly limited, but for example, the positional information of the reference station 36 may be acquired by exchanging information between the information processing apparatus 71 and the reference station 36 through wired or wireless communication, or may be acquired via a portable storage medium in which the positional information of the reference station 36 is stored. The positional information of the reference station 36 acquired by the information processing apparatus 71 is stored in the storage 42.

The processor 40 estimates the position and the posture of the moving object 10A, based on the image data acquired via the communication I/F 77 and the positional information of the reference station 36 acquired from the storage 42. The processor 40 performs GUI control to display estimation results of the position and the posture of the moving object 10A on the display 75. In addition, the processor 40 outputs the estimation results of the position and the posture of the moving object 10A to the moving object 10A via the communication I/F 77.

The communication I/F 19 of the moving object 10A performs wireless communication with the communication I/F 77 of the information processing apparatus 71 to receive the estimation results of the position and the posture of the moving object 10A. The controller 17 controls a flight of the moving object 10A based on the estimation results of the position and the posture of the moving object 10A acquired via the communication I/F 19.

As described above, in the estimation system 70 according to the present second embodiment, it is possible to estimate at least one of the position or the posture of the moving object 10A even in an environment in which the use of the GNSS is difficult.

In the second embodiment described above, the form example has been shown in which the estimation processing program 42A is stored in the storage 42 of the information processing apparatus 71, but the technology of the present disclosure is not limited to this. For example, the estimation processing program 42A is stored in a storage device of another computer, a server device, or the like connected to the information processing apparatus 71 via a network. The estimation processing program 42A may be downloaded in response to a request of the information processing apparatus 71 and installed in the computer 39.

In addition, it is not necessary to store all of the estimation processing program 42A in the storage device such as another computer or server device connected to the information processing apparatus 71, or in the storage 42, but a part of the estimation processing program 42A may be stored.

In addition, although the computer 39 is built in the information processing apparatus 71 shown in FIG. 12 as an example, the technology of the present disclosure is not limited to this, and for example, the computer 39 may be provided outside the information processing apparatus 71.

First Modification Example

In the first and second embodiments described above, the form example has been described in which the plurality of wavelength bands are distinguished from each other by using the central wavelength, but the technology of the present disclosure is not limited to this. In the present first modification example, a wavelength having the highest intensity in a certain wavelength band (hereinafter, also referred to as a peak wavelength) is used to distinguish the plurality of wavelength bands. Specifically, a wavelength band having a peak wavelength on a short wavelength side by a designated wavelength from a peak wavelength in the second wavelength band $\Delta f2$ in which the peak wavelength matches a peak wavelength of a blue LED light source is the first wavelength band $\Delta f1$. Similarly, a wavelength band having a peak wavelength on a long wavelength side by a designated wavelength from the peak wavelength of the second wavelength band $\Delta f2$ is the third wavelength band $\Delta f3$. The first wavelength band $\Delta f1$ is an example of a "third adjacent wavelength band" according to the technology of the present disclosure, and the third wavelength band $\Delta f3$ is an example of a "fourth adjacent wavelength band" according to the technology of the present disclosure.

Hereinafter, subtraction processing in a case where the plurality of wavelength bands are distinguished from each other by using the peak wavelength will be described. First, the image processing unit 40B subtracts the image data of the second wavelength band $\Delta f2$ and the image data of the first wavelength band $\Delta f1$, which has the peak wavelength on the short wavelength side by a designated wavelength from the peak wavelength of the second wavelength band $\Delta f2$. The image processing unit 40B specifies the in-image position GP based on a result of the subtraction processing. The image data of the first wavelength band $\Delta f1$, which has the peak wavelength on the short wavelength side by the designated wavelength from the peak wavelength of the second wavelength band $\Delta f2$, is an example of "fourth image data" according to the technology of the present disclosure.

In addition, the image processing unit 40B subtracts the image data of the second wavelength band $\Delta f2$ and the image data of the third wavelength band $\Delta f3$, which has the peak wavelength on the long wavelength side by a designated wavelength from the peak wavelength of the second wavelength band $\Delta f2$. The image processing unit 40B specifies the in-image position GP based on a subtraction result. The image data of the third wavelength band $\Delta f3$, which has the peak wavelength on the long wavelength side by the designated wavelength from the peak wavelength of the second wavelength band $\Delta f2$, is an example of "fifth image data" according to the technology of the present disclosure.

Also in a case where the fourth wavelength band $\Delta f4$ to the sixth wavelength band $\Delta f6$ are distinguished from each other and in a case where the seventh wavelength band $\Delta f7$ to the ninth wavelength band $\Delta f9$ are distinguished from each other, the fourth wavelength band $\Delta f4$ to the sixth wavelength band $\Delta f6$ and the seventh wavelength band $\Delta f7$ to the ninth wavelength band $\Delta f9$ can be distinguished from each other, respectively, by using the peak wavelength in the same manner as a case where the first wavelength band $\Delta f1$ to the third wavelength band $\Delta f3$ are distinguished from each other. In addition, for the processing of extracting the determination region via the image processing unit 40B, the wavelength band distinguished by using the peak wavelength similarly can be used.

As described above, in the present first modification example, for example, in a case where the light emitter 37 is a blue LED light source, the in-image position GP is specified based on a result of subtraction processing of the image data obtained by imaging in the second wavelength band $\Delta f2$ and the image data obtained by imaging in the first wavelength band $\Delta f1$. Therefore, with the present configuration, it is realized to specify the in-image position GP more accurately and more quickly than a case in which the in-image position GP is specified by using only the image data obtained by imaging in the second wavelength band $\Delta f2$.

In addition, in the present first modification example, for example, in a case where the light emitter 37 is a blue LED light source, the in-image position GP is specified based on a result of subtraction processing of the image data obtained by imaging in the second wavelength band $\Delta f2$ and the image data obtained by imaging in the third wavelength band $\Delta f3$. Therefore, with the present configuration, it is realized to specify the in-image position GP more accurately and more quickly than a case in which the in-image position GP is specified by using only the image data obtained by imaging in the second wavelength band $\Delta f2$.

Second Modification Example

In the first and second embodiments, the form example has been described in which the results of converting the latitude, the longitude, and the altitude of the GNSS coordinates into the coordinates of the three-dimensional orthogonal coordinate system are used as the positional information of the reference station 36, but the technology of the present disclosure is not limited to this. In the present second modification example, the positional information of the reference station 36 is obtained by converting the latitude and the longitude of the GNSS coordinates into coordinates of a two-dimensional orthogonal coordinate system. For example, in a case where the moving object 10 moves at a constant height, the latitude and the longitude of the GNSS coordinates can be converted into coordinates of a two-dimensional orthogonal coordinate system and used as the positional information. Examples of a case where the moving object 10 moves at a constant height include a case where the moving object 10 travels on a flat ground and a case where the moving object 10 flies at a constant height.

With the present second modification example, as compared with a case in which the latitude and the longitude are used as they are as the positional information of the reference station 36, a calculation required for estimating the position and the posture of the moving object 10 is facilitated, and at least one of the position or the posture of the moving object 10 can be estimated more quickly.

In the above-described embodiment, the form example has been described in which the position and the posture of the moving object 10 are estimated in a state in which the reference station 36 is installed, but the technology of the present disclosure is not limited to this. For example, the reference station 36 may be movable. For example, the reference station 36 may comprise a traveling mechanism, and the estimation processing of the position and the posture of the moving object 10 may be performed after the reference station 36 is moved to a position designated in advance. In addition, the reference station 36 may be moved by the worker and then installed at a position designated in advance, and the position and the posture may be estimated in the moving object 10. In addition, the reference station 36 may not be newly prepared, but may be an existing facility (for example, an illumination lamp or a traffic light) comprising a light source corresponding to the light emitter 37 for estimating the position and the posture of the moving object 10.

In addition, in the embodiment described above, the form example has been described in which the image processing unit 40B specifies, in a case where the light emitter 37 is a blue LED light source as an example, the in-image position GP based on a result obtained by subtracting the image data of the first wavelength band $\Delta f1$ or the image data of the third wavelength band $\Delta f3$ from the image data of the second wavelength band $\Delta f2$, but the technology of the present disclosure is not limited to this. For example, the image processing unit 40B may specify the in-image position GP based on a result obtained by subtracting the image data of the second wavelength band $\Delta f2$ from the image data of the first wavelength band $\Delta f1$ or the third wavelength band $\Delta f3$. In addition, the image processing unit 40B may also perform the same subtraction processing in a case of specifying the in-image position GP in a case where the light emitter 37 is a yellow LED light source or a red LED light source as an example.

In addition, in the above-described embodiment, the form example has been described in which the position and the posture of the moving object 10 are estimated, but the technology of the present disclosure is not limited to this. For example, only the position of the moving object 10 may be estimated, or only the posture of the moving object 10 may be estimated.

In addition, in the above-described embodiment, the form example has been described in which the imaging apparatus 30 comprises the pupil division filter 14, and further each pixel of the image sensor 20 has different combinations of the spectroscopic filter elements 26A, 26B, and 26C and the polarization filter elements 24A, 24B, and 24C, so that light having different characteristics is received. However, the technology of the present disclosure is not limited to this. The imaging apparatus 30 only needs to be capable of imaging in a multispectral method, and may be an imaging apparatus capable of imaging in a multispectral method using a filter wheel.

In addition, in the above-described embodiment, the form example has been described in which the imaging apparatus 30 comprises the fisheye lens 11A as the objective lens, but the technology of the present disclosure is not limited to this. For example, a plurality of the imaging apparatuses 30 may be provided, and each imaging apparatus 30 may image the periphery of the moving object 10 in synchronization.

In addition, in the above-described embodiment, the form example has been described in which the light emitter 37 provided in the reference station 36 emits light in a visible light band, but the technology of the present disclosure is not limited thereto. The light emitter 37 may emit light in a wavelength band in which the light emitter 37 can be imaged by the imaging apparatus 30, and may be, for example, an infrared wavelength band.

Figure 13:
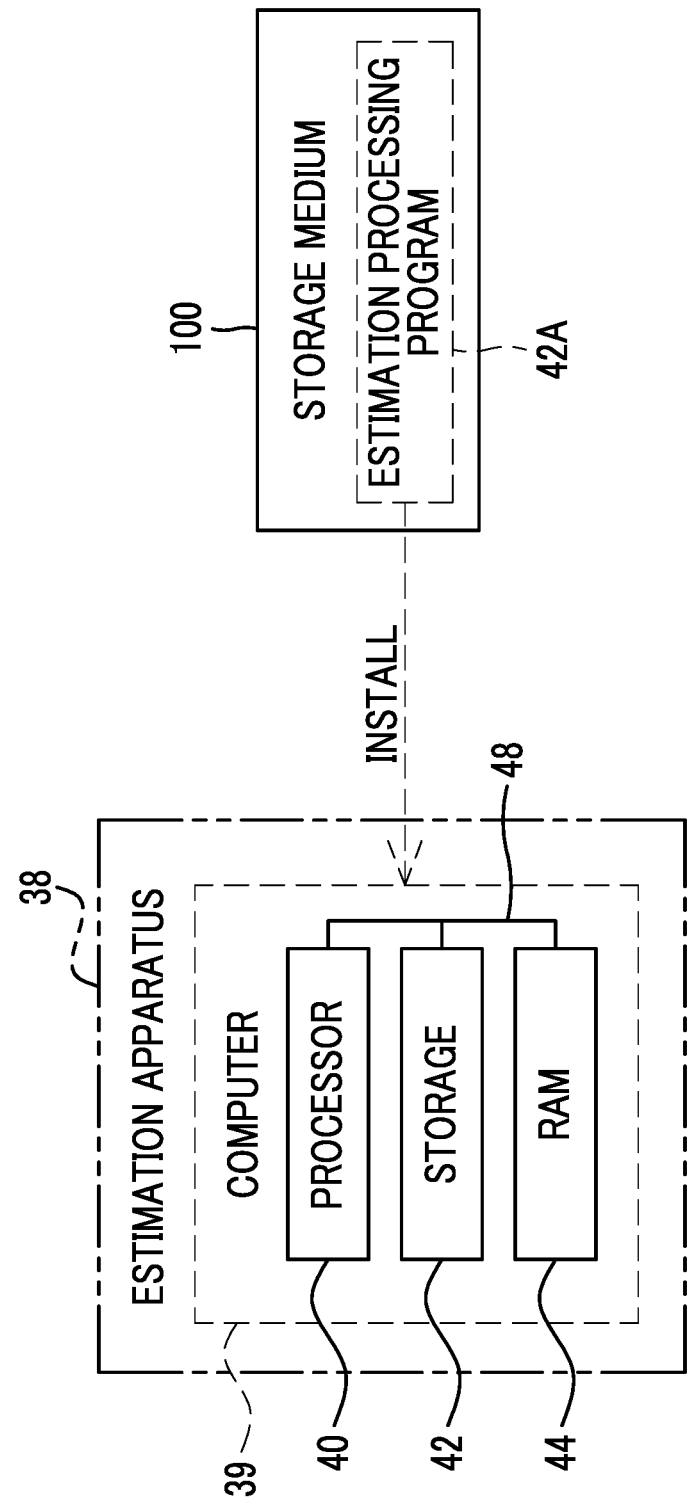
FIG. 13 is a conceptual diagram showing an example of a form of installing an estimation processing program on a computer from a storage medium.

Moreover, in the embodiment described above, the form example has been described in which the estimation processing program 42A is stored in the storage 42, but the technology of the present disclosure is not limited to this. As shown in FIG. 13 as an example, the estimation processing program 42A may be stored in a portable storage medium 100 such as an SSD or a USB memory. The storage medium 100 is a non-transitory computer-readable storage medium. The estimation processing program 42A, which is stored in the storage medium 100, is installed in the computer 39 of the estimation apparatus 38. The processor 40 executes the estimation processing following the estimation processing program 42A.

In the embodiment described above, although the computer 39 is illustrated, the technology of the present disclosure is not limited thereto, and a device including an ASIC, an FPGA, and/or a PLD may be applied instead of the computer 39. Instead of the computer 39, a combination of a hardware configuration and a software configuration may be used.

Further, as a hardware resource for executing the estimation processing described in the embodiment, the following various processors can be used. Examples of the processors include a CPU that is a general-purpose processor configured to execute software, that is, the program to function as the hardware resource for executing the estimation processing. In addition, an example of the processor is a dedicated electronic circuit which is a processor having a dedicated circuit configuration designed to perform a specific process, such as an FPGA, a PLD, or an ASIC. The memory is built in or connected to any processor, and any processor executes the estimation processing by using the memory.

The hardware resource for executing the estimation processing may be configured by one of these various processors, or may be configured by a combination (for example, a combination of a plurality of FPGAs or a combination of the CPU and the FPGA) of two or more processors of the same type or different types. In addition, the hardware resource for executing the estimation processing may be one processor.

As an example where the hardware resource is configured with one processor, first, there is a form in which one processor is configured with a combination of one or more CPUs and software, and the processor functions as the hardware resource for executing the estimation processing. A second example thereof is a form in which a processor that realizes the functions of the entire system including a plurality of hardware resources for executing the estimation processing with one IC chip is used, as represented by SoC. As described above, the estimation processing is realized by using one or more of the various processors as the hardware resources.

In addition, specifically, an electronic circuit obtained by combining circuit elements, such as semiconductor elements, can be used as the hardware structure of the various processors. The above-described estimation processing is merely an example. Accordingly, it goes without saying that unnecessary steps may be deleted, new steps may be added, or a processing order may be changed without departing from the gist.

The content of the above description and the content of the drawings are detailed description of portions according to the technology of the present disclosure, and are merely examples of the technology of the present disclosure. For example, the above description relating to configurations, functions, operations, and advantageous effects is description relating to an example of configurations, functions, operations, and advantageous effects of the portions according to the technology of the present disclosure. Thus, it is needless to say that unnecessary portions may be deleted, new elements may be added, or replacement may be made to the content of the above description and the content of the drawings without departing from the gist of the technology of the present disclosure. Furthermore, to avoid confusion and to facilitate understanding of the portions according to the technology of the present disclosure, description relating to common technical knowledge and the like that does not require particular description to enable implementation of the technology of the present disclosure is omitted from the content of the above description and from the content of the drawings.

In this specification, "A and/or B" is synonymous with "at least one of A or B". That is, "A and/or B" may refer to A alone, B alone, or a combination of A and B. Furthermore, in this specification, a similar concept to "A and/or B" applies to a case in which three or more matters are expressed by linking the matters with "and/or".

The disclosure of Japanese Patent Application No. 2021-161787 filed on Sep. 30, 2021, is incorporated in this specification by reference in its entirety.

All cited documents, patent applications, and technical standards described in the specification are incorporated by reference in the specification to the same extent as in a case where each individual cited document, patent application, or technical standard is specifically and individually indicated to be incorporated by reference.

What is claimed is:

1. An estimation apparatus comprising:
a processor that is configured to:
acquire positional information of a plurality of reference stations each having a light emitter that emits light in wavelength bands different from each other;
acquire image data obtained by imaging an imaging scene including the light emitter via an imaging apparatus mounted on a moving object, the image data including a plurality of image data groups obtained by imaging the imaging scene via the imaging apparatus in a plurality of the wavelength bands;
specify an in-image position of a light emitter of one reference station among the plurality of reference stations, based on a result of subtraction processing of first image data obtained by imaging the imaging scene in a light emitter wavelength band, which is a wavelength band in which the light emitter of the one reference station emits light, and second image data obtained by imaging the imaging scene in a first adjacent wavelength band, which has a central wavelength on one of a long wavelength side or a short wavelength side by a designated wavelength from a central wavelength of the light emitter wavelength band; and
estimate at least one of a position of the moving object or a posture of the moving object based on the in-image position and the positional information of the plurality of reference stations.

2. The estimation apparatus according to claim 1,
wherein the processor is configured to:
specify the in-image position of the light emitter of the one reference station, based on a result of subtraction processing of the first image data and third image data obtained by imaging the imaging scene in a second adjacent wavelength band, which has a central wavelength on another side with respect to the first adjacent wavelength band by a designated wavelength from the central wavelength of the light emitter wavelength band.

3. The estimation apparatus according to claim 1,
wherein the image data includes a plurality of image data groups obtained by imaging the imaging scene via the imaging apparatus in a plurality of the wavelength bands, and
the processor is configured to:
specify the in-image position of a light emitter of one reference station among the plurality of reference stations, based on a result of subtraction processing of first image data obtained by imaging in a light emitter wavelength band, which is a wavelength band in which the light emitter of the one reference station emits light, and fourth image data obtained by imaging the imaging scene in a third adjacent wavelength band, which has a wavelength having the highest intensity on one of a long wavelength side or a short wavelength side by a designated wavelength from a wavelength having the highest intensity in the light emitter wavelength band.

4. The estimation apparatus according to claim 3,
wherein the processor is configured to:
specify the in-image position of the light emitter of the one reference station, based on a result of subtraction processing of the first image data and fifth image data obtained by imaging the imaging scene in a fourth adjacent wavelength band, which has a wavelength having the highest intensity on another side with respect to the third adjacent wavelength band by a designated wavelength from the wavelength having the highest intensity in the light emitter wavelength band.

5. The estimation apparatus according to claim 1,
wherein the image data includes a plurality of image data groups obtained by imaging the imaging scene via the imaging apparatus in a plurality of the wavelength bands, and
the processor is configured to:
specify the in-image position of a light emitter of one reference station among the plurality of reference stations, based on sixth image data obtained by imaging the imaging scene in a wavelength band different from a light emitter wavelength band in which the light emitter of the one reference station emits light.

6. The estimation apparatus according to claim 1,
wherein the positional information is obtained by converting a latitude and a longitude of each of the plurality of reference stations into coordinates in a two-dimensional orthogonal coordinate system.

7. The estimation apparatus according to claim 1,
wherein the positional information is obtained by converting a latitude, a longitude, and an altitude of each of the plurality of reference stations into coordinates in a three-dimensional orthogonal coordinate system.

8. The estimation apparatus according to claim 1,
wherein the plurality of reference stations are three or more.

9. An imaging apparatus comprising:
an image sensor; and
the estimation apparatus according to claim 1,
wherein the estimation apparatus is configured to estimate at least one of the position of the moving object or the posture of the moving object using an image obtained by imaging the imaging scene via the image sensor.

10. The imaging apparatus according to claim 9, wherein the image sensor is an image sensor capable of imaging in a multispectral method.

11. A moving object comprising:
an imaging apparatus; and
an estimation apparatus that is configured to:
acquire positional information of a plurality of reference stations each having a light emitter that emits light in wavelength bands different from each other;
acquire image data obtained by imaging an imaging scene including the light emitter via the imaging apparatus, the image data including a plurality of image data groups obtained by imaging the imaging scene via the imaging apparatus in a plurality of the wavelength bands;
specify an in-image position of a light emitter of one reference station among the plurality of reference stations, based on a result of subtraction processing of first image data obtained by imaging the imaging scene in a light emitter wavelength band, which is a wavelength band in which the light emitter of the one reference station emits light, and second image data obtained by imaging the imaging scene in a first adjacent wavelength band, which has a central wavelength on one of a long wavelength side or a short wavelength side by a designated wavelength from a central wavelength of the light emitter wavelength band; and
estimate at least one of a position of the moving object or a posture of the moving object based on the in-image position and the positional information of the plurality of reference stations.

12. An estimation system comprising:
a moving object on which an imaging apparatus is mounted;
an estimation apparatus; and
a plurality of reference stations each having a light emitter that emits light in wavelength bands different from each other,
wherein the estimation apparatus is configured to:
acquire positional information of the plurality of reference stations;
acquire image data obtained by imaging an imaging scene including the light emitter via the imaging apparatus, the image data including a plurality of image data groups obtained by imaging the imaging scene via the imaging apparatus in a plurality of the wavelength bands;
specify an in-image position of a light emitter of one reference station among the plurality of reference stations, based on a result of subtraction processing of first image data obtained by imaging the imaging scene in a light emitter wavelength band, which is a wavelength band in which the light emitter of the one reference station emits light, and second image data obtained by imaging the imaging scene in a first adjacent wavelength band, which has a central wavelength on one of a long wavelength side or a short wavelength side by a designated wavelength from a central wavelength of the light emitter wavelength band; and
estimate at least one of a position of the moving object or a posture of the moving object based on an in-image position and the positional information of the plurality of reference stations.

13. An estimation method comprising:
acquiring positional information of a plurality of reference stations each having a light emitter that emits light in wavelength bands different from each other;
acquiring image data obtained by imaging an imaging scene including the light emitter via an imaging apparatus mounted on a moving object, the image data including a plurality of image data groups obtained by imaging the imaging scene via the imaging apparatus in a plurality of the wavelength bands;
specifying an in-image position of a light emitter of one reference station among the plurality of reference stations, based on a result of subtraction processing of first image data obtained by imaging the imaging scene in a light emitter wavelength band, which is a wavelength band in which the light emitter of the one reference station emits light, and second image data obtained by imaging the imaging scene in a first adjacent wavelength band, which has a central wavelength on one of a long wavelength side or a short wavelength side by a designated wavelength from a central wavelength of the light emitter wavelength band; and
estimating at least one of a position of the moving object or a posture of the moving object based on the in-image position and the positional information of the plurality of reference stations.

14. A non-transitory storage medium storing a program causing a computer to execute a process comprising:
acquiring positional information of a plurality of reference stations each having a light emitter that emits light in wavelength bands different from each other;
acquiring image data obtained by imaging an imaging scene including the light emitter via an imaging apparatus mounted on a moving object, the image data including a plurality of image data groups obtained by imaging the imaging scene via the imaging apparatus in a plurality of the wavelength bands;
specifying an in-image position of a light emitter of one reference station among the plurality of reference stations, based on a result of subtraction processing of first image data obtained by imaging the imaging scene in a light emitter wavelength band, which is a wavelength band in which the light emitter of the one reference station emits light, and second image data obtained by imaging the imaging scene in a first adjacent wavelength band, which has a central wavelength on one of a long wavelength side or a short wavelength side by a designated wavelength from a central wavelength of the light emitter wavelength band; and
estimating at least one of a position of the moving object or a posture of the moving object based on the in-image position and the positional information of the plurality of reference stations.

\* \* \* \* \*